United States Patent
Karimoto et al.

(10) Patent No.: US 7,305,173 B2
(45) Date of Patent: Dec. 4, 2007

(54) DECODING DEVICE AND DECODING METHOD

(75) Inventors: Takashi Karimoto, Kanagawa (JP); Masayoshi Mizuno, Tokyo (JP)

(73) Assignee: Sony Corporation, Tokyo (JP)

( * ) Notice: Subject to any disclaimer, the term of this patent is extended or adjusted under 35 U.S.C. 154(b) by 813 days.

(21) Appl. No.: 10/486,198

(22) PCT Filed: Jun. 11, 2003

(86) PCT No.: PCT/JP03/07437

§ 371 (c)(1),
(2), (4) Date: Feb. 13, 2004

(87) PCT Pub. No.: WO04/002145

PCT Pub. Date: Dec. 31, 2003

(65) Prior Publication Data

US 2004/0240859 A1 Dec. 2, 2004

(30) Foreign Application Priority Data

Jun. 20, 2002 (JP) .............................. 2002-180411

(51) Int. Cl.
*H04N 7/26* (2006.01)
(52) U.S. Cl. ..................................................... 386/109
(58) Field of Classification Search .................. 386/68, 386/109–112, 117, 122, 124, 129, 131, 46, 386/95, 37, 40; 348/441, 443, 459, 607; 360/32, 36.2; 375/240.01
See application file for complete search history.

(56) References Cited

U.S. PATENT DOCUMENTS 5,317,413 A * 5/1994 Yanagihara .................. 386/131

(Continued)

FOREIGN PATENT DOCUMENTS

| JP | 2001-352517 | 12/2001 |
|---|---|---|
| JP | 2003-18549 | 1/2003 |
| JP | 2003-242753 | 8/2003 |

OTHER PUBLICATIONS

U.S. Appl. No. 10/486,546, filed Feb. 10, 2004, Karimoto et al.
U.S. Appl. No. 10/486,198, filed Feb. 13, 2004, Karimoto et al.

*Primary Examiner*—Thai Q. Tran
*Assistant Examiner*—Mishawn Dunn
(74) *Attorney, Agent, or Firm*—Oblon, Spivak, McClelland, Maier & Neustadt, P.C.

(57) ABSTRACT

Disclosed is a decoding apparatus for performing decoding processing in keeping with multi-view broadcast. The decoding apparatus includes a picture stream data storage unit (31) for allocating a storage area for each picture stream data and storing the storage area, a picture stream data readout (14) for time-divisionally reading out the picture stream data stored in the storage area, a decoding unit (33) for decoding the read-out picture stream data into a picture frame, a picture frame storage unit (34) for storing the picture frame, a management table storage unit (15) for storing a management table for supervising the state-of-use information indicating the state of use of the picture frame storage unit (34), a first decision unit (host CPU) (14) for determining whether or not a picture frame is storable in a picture frame storage unit (34), based on the state-of-use information supervised by the management table, and an allowance unit (host CPU) (14) for allowing readout of the picture stream data from a picture stream data storage unit (31) of the picture stream data readout unit (host CPU) (14).

16 Claims, 15 Drawing Sheets

U.S. PATENT DOCUMENTS

| | | | |
|---|---|---|---|
| 5,329,374 A * | 7/1994 | Ezaki | 386/93 |
| 5,394,249 A * | 2/1995 | Shimoda et al. | 386/124 |
| 5,394,275 A * | 2/1995 | Iketani et al. | 386/35 |
| 5,574,506 A * | 11/1996 | Rhodes | 348/459 |
| 5,909,532 A * | 6/1999 | Kanota et al. | 386/26 |
| 6,614,989 B1 * | 9/2003 | Bruls et al. | 386/110 |

* cited by examiner (VIRTUAL FRAME)

DECODING DEVICE AND DECODING METHOD

TECHNICAL FIELD

This invention relates to digital television broadcast. More particularly, it relates to an apparatus and a method for properly decoding picture stream data of received broadcast depending on the sorts and the number of the picture stream data.

This application claims priority of Japanese Patent Application No.2002-180411, filed in Japan on Jun. 20, 2002, the entirety of which is incorporated by reference herein.

BACKGROUND ART

Up to now, digital broadcast services, enabling broadcast services featured by provision of high-quality programs or multi-channel programs, have been implemented as broadcast exploiting a broadcasting satellite (BS) or a communication satellite (CS).

The digital broadcast services are centered about digital high definition television (HDTV). However, in BS digital broadcast services, it has been devised to render services, termed multi-view broadcast, during the time zone other than that for digital high definition television broadcast.

The multi-view broadcast means broadcast services in which the band of the digital high definition television broadcast is split into three channels and plural interrelated contents of a given sole program are broadcast simultaneously as the routine standard definition television (SDTV), as shown in FIG. 1.

For example, when the multi-view broadcast is received, the images from three camera angles of a sports program or a re-broadcast from a theater may be viewed simultaneously, or only images from a desired angle may be viewed.

In viewing the multi-view broadcast, it is necessary to decode the entire digital standard definition television broadcast received by a receiver receiving the multi-view broadcast.

As described above, in order for a receiver receiving the digital broadcast to cope with multi-view broadcast, the received standard television broadcast needs to be decoded in its entirety.

A receiver is able to cope with multi-view broadcast if the receiver is provided with a number of decoders for decoding received digital broadcast equal to the number of channels of the multi-view broadcast.

If, with a view to coping with multi-view broadcast, a number of the decoders equal to the number of channels of the standard television broadcast, provided by the multi-view broadcast, are provided to the receiver, the cost would be considerable. Moreover, there is such a problem that the receiver is increased in size with the increasing number of the decoders.

DISCLOSURE OF THE INVENTION

It is an object of the present invention to provide a novel decoding apparatus and a novel decoding method whereby the problems inherent in the conventional receiver for multi-view broadcast may be resolved.

It is another object of the present invention to provide a decoding apparatus and a decoding method configured for coping with multi-view broadcast without increasing the number of decoders.

For accomplishing the above object, the present invention provides a decoding apparatus comprising picture stream data storage means for storing input m picture stream data to each of storage areas allocated to the respective picture stream data, where m is a natural number, picture stream data readout means for time-divisionally reading out the m picture stream data stored in the picture stream data storage means, decoding means for decoding the m picture stream data, time-divisionally read out from the picture stream data readout means, into respective picture frames, picture frame storage means for storing the picture frames decoded by the decoding means, first decision means for determining whether or not the picture frames are storable in the picture frame storage means, second decision means for determining whether or not the picture stream data are decodable in the decoding means, controlling means for controlling the readout of the picture stream data from the picture stream data storage means by the picture stream data readout means based on the results of decision by the first decision means and the second decision means, picture frame readout means for reading out the picture frames stored in the picture frame storage means, and outputting means for arraying the picture frames, corresponding to the respective picture stream data read out by the picture frame readout means, on the same picture screen, and outputting the picture data.

A decoding method according to the present invention comprises a picture stream data storage step of storing input m picture stream data to each of storage areas allocated to the respective picture stream data, where m is a natural number, a picture stream data readout step of time-divisionally reading out the m picture stream data stored in the picture stream data storage step, a decoding step of decoding the m picture stream data, time-divisionally read out from the picture stream data readout step, into respective picture frames, a picture frame storage step of storing the picture frames decoded by the decoding step in picture frame storage means, a first decision step of determining whether or not the picture frames are storable in the picture frame storage step, a second decision step of determining whether or not the picture stream data are decodable in the decoding step, a controlling step of controlling the readout of the picture stream data from the picture stream data storage means by the picture stream data readout step based on the results of decision by the first decision step and the second decision step, a picture frame readout step of reading out the picture frames stored in the picture frame storage means, and an outputting step of arraying the picture frames, corresponding to the respective picture stream data read out by the picture frame readout step, on the same picture screen, and outputting the picture data.

Another decoding apparatus according to the present invention comprises inputting means for supplying a multiplexed stream, obtained on multiplexing m picture stream data, where m is a natural number, demultiplexing means for demultiplexing the multiplexed stream, supplied to the inputting means, into m picture stream data, picture stream data storage means for storing m picture stream data, demultiplexed by the demultiplexing means, to respective storage areas, allocated to the respective picture stream data, where m is a natural number, picture stream data readout means for time-divisionally reading out the picture stream data stored in the picture stream data storage means, decoding means for decoding the m picture stream data, read out from the picture stream data readout means, into respective picture frames, picture frame storage means for storing the picture frames decoded by the decoding means, first decision means for determining whether or not the picture frames are storable in the picture frame storage means, second decision means for determining whether or not the picture stream data are decodable in the decoding means, controlling means for controlling the readout of the picture stream data from the picture stream data storage means by the picture stream data readout means based on the results of decision by the first decision means and the second decision means, picture frame readout means for reading out the picture frames stored in the picture frame storage means, and outputting means for arraying the picture frames, corresponding to the respective picture stream data read out by the picture frame readout means, on the same picture screen, and outputting the picture data.

Another decoding method according to the present invention comprises an inputting step for supplying a multiplexed stream, obtained on multiplexing m picture stream data, where m is a natural number, a demultiplexing step for demultiplexing the multiplexed stream, supplied to the inputting step, into m picture stream data, a picture stream data storage step for storing m picture stream data, demultiplexed by the demultiplexing step, in each of respective storage areas, allocated to the respective picture stream data, where m is a natural number, a picture stream data readout step for time-divisionally reading out the picture stream data stored in the picture stream data storage step, a decoding step for decoding the m picture stream data, read out from the picture stream data readout step, into respective picture frames, a picture frame storage step for storing the picture frames decoded by the decoding step in picture frame storage means, a first decision step for determining whether or not the picture frames are storable in the picture frame storage means, a second decision step for determining whether or not the picture stream data are decodable in the decoding step, a controlling step for controlling the readout of the picture stream data from the picture stream data storage means by the picture stream data readout step based on the results of decision by the first decision step and the second decision step, a picture frame readout step for reading out the picture frames stored in the picture frame storage step, and an outputting step for arraying the picture frames, corresponding to the respective picture stream data read out by the picture frame readout step, on the same picture screen, and outputting the picture data.

Other objects and specific advantages of the present invention will become more apparent from the following explanation of the preferred embodiments especially when read in conjunction with the drawings.

BEST MODE FOR CARRYING OUT THE INVENTION

Figure 1:
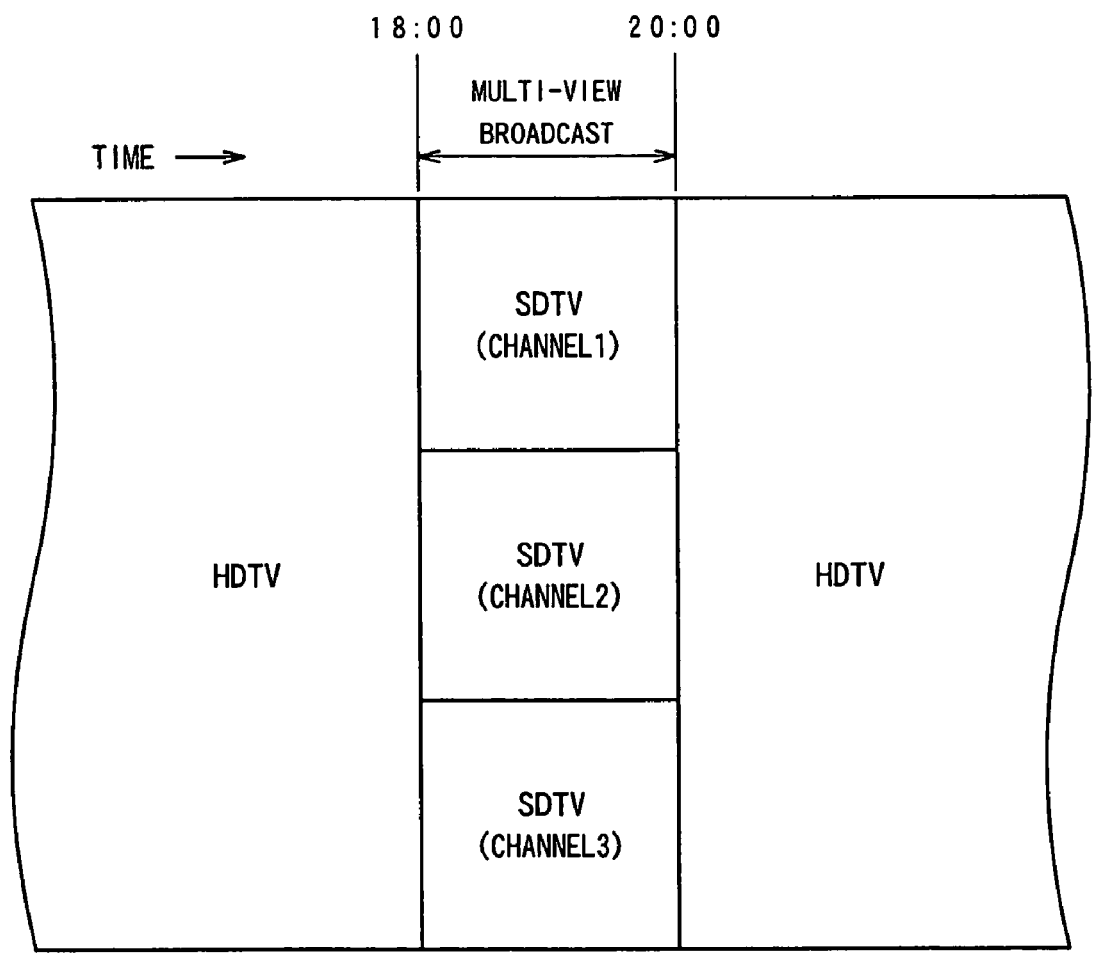
FIG. 1 illustrates multi-view broadcast.

Referring to the drawings, a decoding apparatus and a decoding method according to the present invention are explained in detail.

Figure 2:
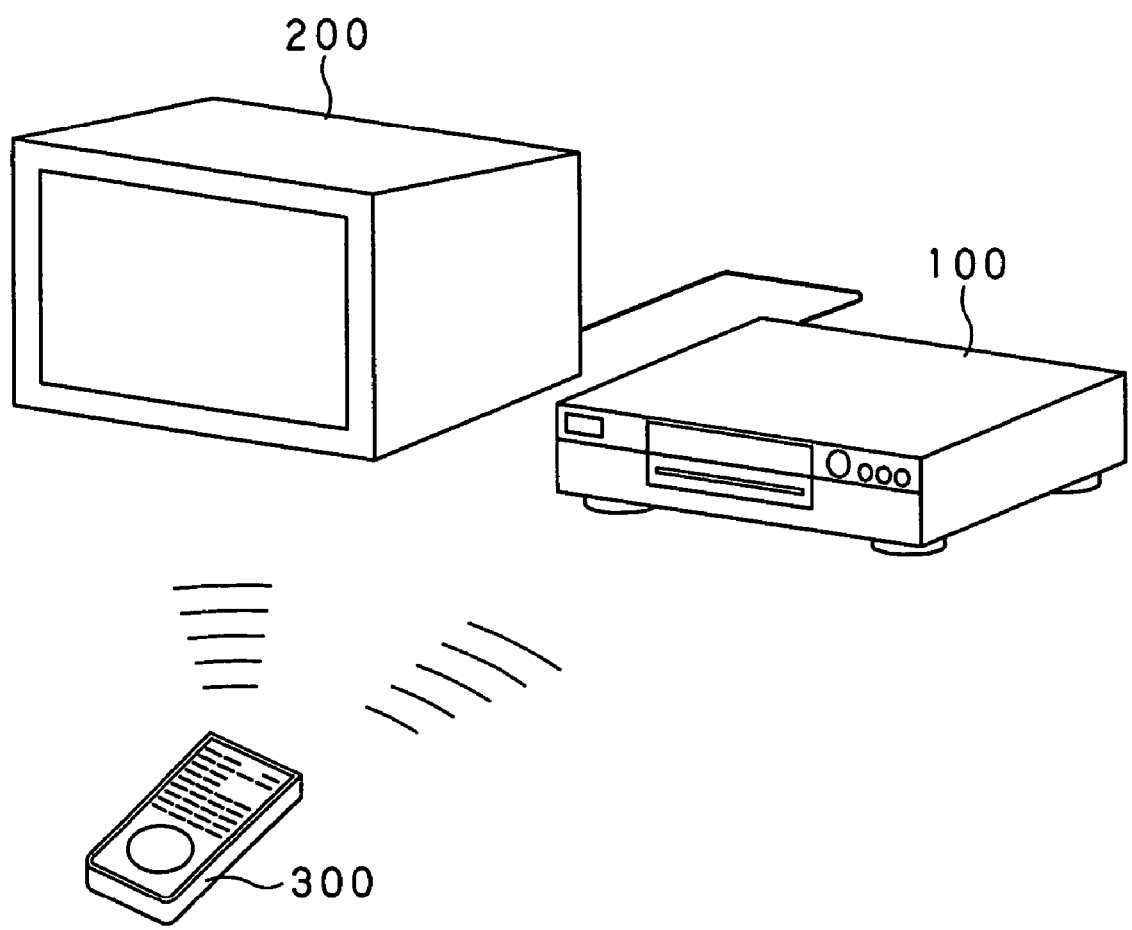
FIG. 2 shows the manner of use of a recording and/or reproducing apparatus according to the present invention.

The present invention is applied to a recording and/or reproducing apparatus 100 shown in FIG. 2. This recording and/or reproducing apparatus 100 is connected to a television receiver 200, as shown in FIG. 2.

In the television receiver 200, there may be enclosed a ground wave tuner, capable of receiving the ground wave, a BS (broadcasting satellite) tuner, a BS digital tuner or a CS (communications satellite) tuner.

The various functions of the recording and/or reproducing apparatus 100 may be remote-controlled by a remote controller 300, as shown in FIG. 2. Additionally, the various functions of the television receiver 200 may also be remote-controlled by the remote controller 300.

The recording and/or reproducing apparatus 100, embodying the present invention, is a recording and/or reproducing apparatus capable of recording picture signals, speech signals or a variety of data of the digital high definition television broadcast on the recording medium without compression. Moreover, the recording and/or reproducing apparatus 100 has enclosed therein a digital tuner, as later explained, and is capable of receiving digital high definition television broadcast, supplied by BS digital broadcast, to record the so received digital high definition television broadcast on the recording medium.

Figure 3:
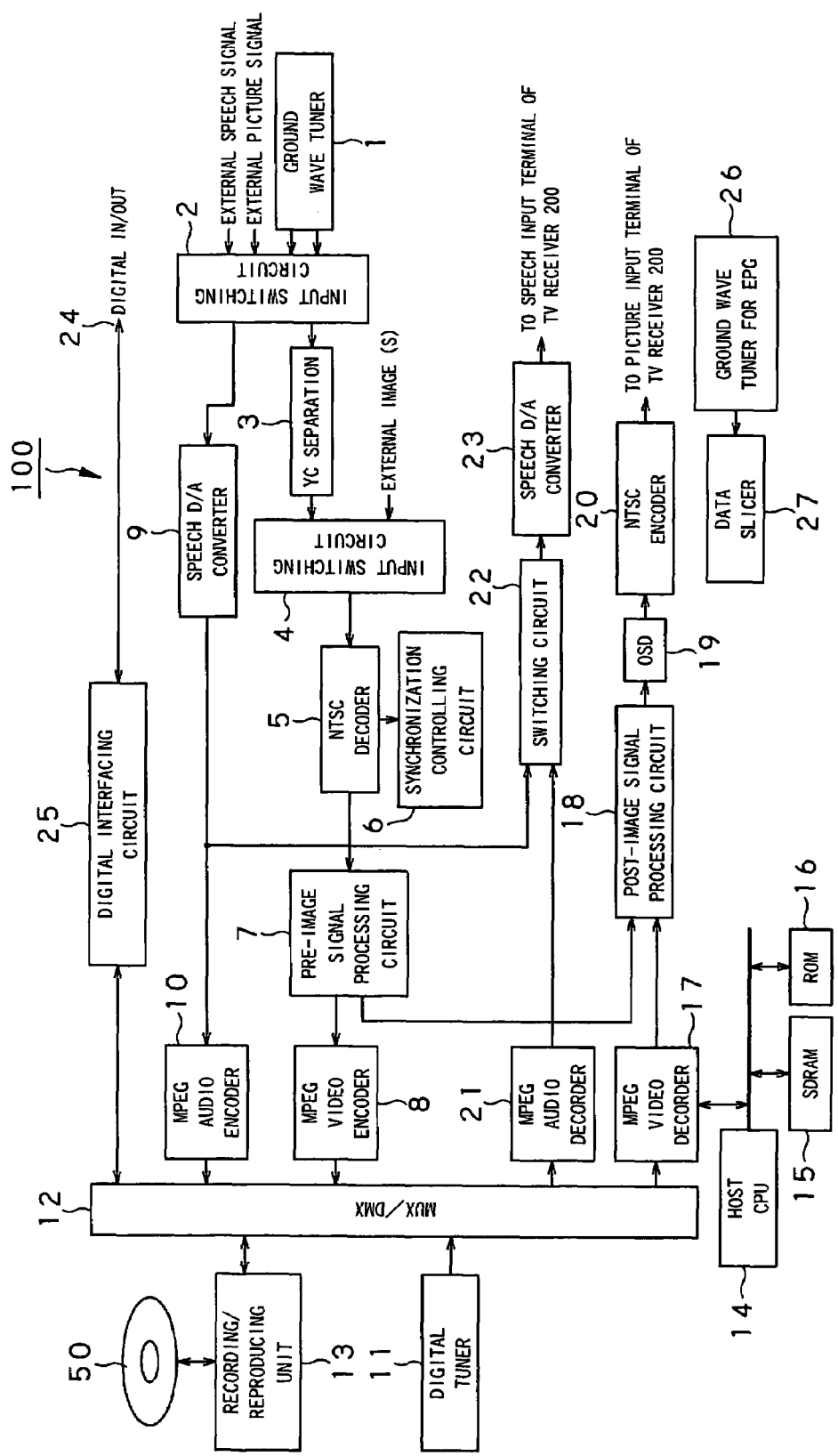
FIG. 3 is a block diagram showing an essential structure of the recording and/or reproducing apparatus according to the present invention.

Referring to FIG. 3, the essential structure of the recording and/or reproducing apparatus 100 is explained.

The recording and/or reproducing apparatus 100 includes a ground wave tuner 1, an input switching circuit 2, a YC separation circuit 3, an input switching circuit 4, an NTSC (National Television System Standard Committee) decoder 5, a synchronization controlling circuit 6, a pre-image signal processing circuit 7, an MPEG (Moving Picture Experts Group) video encoder 8, a speech A/D converter 9, an MPEG audio encoder 10, a digital tuner 11, a multiplex/demultiplex circuit (MUX/DMX) 12, a recording/reproducing unit 13, a host CPU 14, an SDRAM (synchronous dynamic random access memory) 15, a ROM (read-only memory) 16, an MPEG video recorder 17, a post video signal processing circuit 18, an OSD (on-screen display) 19, an NTSC encoder 20, an MPEG audio decoder 21, a switching circuit 22, a speech D/A converter 23, a digital IN/OUT 24, a digital interfacing circuit 25, ground wave tuner for EPG 26, and a data slicer 27.

The ground wave tuner 1 receives ground wave broadcast and sends composite picture signals and the speech signals of the so received broadcast to the input switching circuit 2.

The input switching circuit 2 is supplied with composite picture signals and speech signals from the ground wave tuner 1, while being supplied with composite picture signals and with speech signals from an external device. The input switching circuit 2 selects either the composite picture signals and the speech signals, supplied from the ground wave tuner 1, or the composite picture signals and the speech signals, supplied from the external device, subject to commands from the host CPU 14. The input switching circuit 2 outputs the selected composite picture signals and selected speech signals to the YC separation circuit 3 and to the speech A/D converter 9, respectively.

The YC separation circuit 3 separates the composite picture signals, supplied from the input switching circuit 2, into Y and C, to send the resulting signals to the input switching circuit 4.

The input switching circuit 4 selects the S picture input from outside or the outputs from the YC separation circuit 3, subject to the command from the host CPU 14, to send the so selected signal to the NTSC decoder 5.

The NTSC decoder 5 performs the processing e.g. of A/D conversion or chroma encoding, on the input picture signals, to convert the signals into digital component picture signals, referred to below as picture data, which is supplied to the pre-image signal processing circuit 7. The NTSC decoder 5 also sends clocks, generated with the horizontal synchronizing signals of the input picture signals, as reference, and the horizontal synchronizing signals, vertical synchronizing signals and field discriminating signals, generated on synchronous separation, to the synchronization controlling circuit 6.

The synchronization controlling circuit 6 generates clocks and synchronization signals, the timing of which has been converted to the timing required for respective blocks, as later explained, from the horizontal synchronizing signals, vertical synchronizing signals and field discriminating signals, used as references, to send the resulting clocks and synchronization signals to the respective blocks forming the recording and/or reproducing apparatus 100.

The pre-image signal processing circuit 7 applies various video signal processing operations, such as pre-filtering, to the picture data supplied from the NTSC decoder 5, to send the so processed signals to the MPEG video encoder 8 and to the post picture signal processing circuit 18.

The MPEG video encoder 8 applies encoding processing, such as block DCT (discrete cosine transform), to the picture data supplied from the pre-image signal processing circuit 7, to generate an ES (elementary stream) of the picture to send the so produced ES to the multiplex/demultiplex circuit 12. Although the MPEG is used as the compression system, it is also possible to use other compression systems, or to leave the signals uncompressed.

The speech A/D converter 9 converts the speech signals, selected by the input switching circuit 2, into digital speech signals, which are supplied to the MPEG audio encoder 10.

The MPEG audio encoder 10 compresses the supplied digital speech signals, in accordance with the MPEG format, to generate the ES of the speech, which ES is supplied to the multiplex/demultiplex circuit 12, in the same way as the picture signals. Although the MPEG is used as the compression system, it is also possible to use other compression systems, or to leave the signals uncompressed.

The digital tuner 11 is a tuner for receiving the BS digital broadcast, CS digital broadcast and the ground wave digital broadcast. Although the BS digital broadcast represents services centered about digital high definition broadcast, standard television broadcast may also be supplied. For example, the BS digital broadcast is assumed to be providing multi-channel broadcast consisting in splitting the framework of the digital high definition television broadcast into three standard television broadcasts and simultaneously airing the three broadcasts, as well as multi-view broadcast consisting in splitting the band of the digital high definition television broadcast into three channels and simultaneously airing the plural mutually relevant contents as standard television broadcast.

The digital tuner 11 receives BS digital broadcasts, transmitted with multiplexing in a MPEG2 transport stream and modulation in accordance with a preset modulation system, and sends the so received TS signal to the multiplex/demultiplex circuit 12.

Meanwhile, if the number of the horizontal effective pixels of the picture signals of the effective horizontal pixels of the picture signals of the NTSC system, received by the ground wave tuner 1 or the digital tuner 11 (picture_coding_h_size), is not less than 720 or the number of the vertical effective pixels thereof (picture_coding_v_size) is not less than 480, the picture signals received are presumed to be the picture signals of the digital high definition television (high definition television), that is the picture signals encoded in accordance with the HD system. The other picture signals are presumed to be picture signals encoded in accordance with the SD system.

If the picture signals received by the ground wave tuner 1 or the digital tuner 11 are of the PAL system (Phase Alternation by Line) system, the number of the effective horizontal pixels of the picture signals is not less than 720 or the number of the effective vertical pixels thereof is not less than 540, the picture signals are presumed to be the picture signals aired in accordance with the digital high definition system, that is, the picture signals encoded in accordance with the HD system. The other picture signals are presumed to be the picture signals encoded with the SD system.

For example, in the BS digital broadcast, CS digital broadcast or ground wave digital broadcast in Japan, "ARIB STD-B32 'Picture Encoding, Speech Encoding and Multiplexing System', Denpa-Sangyoukai, Body corporate, Chapter 5" provides for picture signals for digital high definition television and picture signals of the standard definition television, in terms of the number of effective horizontal pixels, the number of effective vertical pixels and the frame rate.

Specifically, the picture signals of the digital high definition television broadcast are prescribed to be (1920×1080i; 29.97 Hz), (1440×1080i; 29.97 Hz), (1280×720p; 59.94 Hz), (720×480p; 59.94 Hz), where the number of effective horizontal pixels, the number of effective vertical pixels and the frame rate are expressed as (the number of effective horizontal pixels× number of effective vertical pixels; frame rate).

On the other hand, the picture signals of the standard television broadcast are prescribed to be (720×480i; 29.97 Hz), (544×480i; 29.97 Hz, with the number of effective horizontal pixels of real picture data being 540), (480×480i; 29.97 Hz). The picture signals, transmitted at a lower level of resolution as broadcast for coping with rainfall in the BS digital broadcast, are prescribed to be (352×240p; 29.97 Hz or less), and become the standard television broadcast.

Meanwhile, the suffixes "i" and "p" denote the scanning system, such as the "interlacing" scanning system or the "progressive" scanning system, respectively.

On the other hand, in the ground wave broadcast and the ATSC cable broadcast of ATSC (Advanced TV System Committee) in USA, the picture signals of the digital high definition television are prescribed in "ATSC Standard A/53B with Amendment 1: ATSC Digital Television Standard, Rev. B Annex A. Table-A3" in terms of the number of effective horizontal pixels, the number of effective vertical pixels and the frame rate.

Specifically, the picture signals of the digital high definition television broadcast are prescribed to be (1920× 1080p; 23.976, 24, 29.97, 30 Hz), (1920×1080i; 29.97, 30 Hz), (1280×720p; 23.976, 24, 29.97, 30, 59.94, 60 Hz), (704×480p; 23.976, 24, 29.97, 30, 59.94, 60 Hz), (704×480i; 29.97, 30 Hz), (640×480p; 23.976, 24, 29.97, 30, 59.94, 60 Hz), (640×480i; 29.97, 30 Hz), where the number of effective horizontal pixels, the number of effective vertical pixels and the frame rate are expressed as (the number of effective horizontal pixels× number of effective vertical pixels; frame rate).

In recording on a recording medium 50, the multiplex/demultiplex circuit 12 multiplexes a picture ES, a speech ES and a variety of control signals on a recording medium 50 as later explained. The multiplex/demultiplex circuit 12 combines the input MPEG picture ES, MPEG speech ES and the control signals to perform multiplexing processing, such as generation of a transport stream of the MPEG system, and buffer control processing, to output the resulting signal to the recording/reproducing unit 13.

The buffer control processing means exercising control for intermittently sending continuously supplied TS (transport streams) to a downstream side recording/reproducing unit 13. For example, the recording/reproducing unit 13 records the continuously supplied TS signal, without interruption, by causing the TS to be transiently stored in a buffer during the time the recording/reproducing unit 13 is performing the seek operation for the recording medium 50, since the TS cannot be written during this time, and by writing the TS at a higher rate than the input rate when the writing is possible.

In reproducing the recording medium 50, as later explained, the multiplex/demultiplex circuit 12 manages buffer control so that the TS reproduced by the recording/reproducing unit 13 and supplied intermittently will be supplied continuously. The multiplex/demultiplex circuit 12 then proceeds to demultiplexing processing. In the demultiplexing processing, performed by the multiplex/demultiplex circuit 12, a PES (packetized elementary stream) is extracted from the TS and further separated into a picture ES and a speech ES, which are then sent to the MPEG video recorder 17 and to the MPEG audio decoder 21, respectively.

After the digital signal is received and the scrambling proper to the digital broadcast, applied to the TS signal, is reset, the digital tuner 11 sends the TS to the multiplex/demultiplex circuit 12. The multiplex/demultiplex circuit 12 extracts the PES from the supplied TS signal and, as in reproducing the recording medium 50, further separates the PES into the video PS and the audio ES, which are then sent to the MPEG video recorder 17 and to the MPEG audio decoder 21, respectively.

In carrying out the separation processing, described above, the multiplex/demultiplex circuit 12 acquires the PSI (program specific information), such as PMT (program map table), stating the PID of the TS packet, in which there are held services exemplified by video, audio or the relevant information constituting a broadcast program, multiplexed in the TS, and outputs the so acquired PSI to the host CPU 14.

From the so acquired PSI information, the host CPU 14 is able to detect whether the extracted PES is an HD stream, as a stream of the digital high definition television broadcast, or an SD stream, as a stream of the standard definition television broadcast and, in case the extracted PES is the SD stream, how many SD streams are transmitted.

From the purging information of a variety of the information, enclosed in the multiplex/demultiplex circuit 12, the multiplex/demultiplex circuit 12 extracts the electronic program guide (EPG) inserted into the BS signal, and routes the so extracted EPG to the host CPU 14. The host CPU 14 analyzes this EPG signal to display the program guide on the GUI.

The recording/reproducing unit 13 performs the processing of recording data on the recording medium 50 and of reproducing the data recorded on the recording medium 50. The recording medium 50 is exemplified by an optical disc, magneto-optical disc or a solid memory, that may be loaded on a loading unit, not shown, of the recording and/or reproducing apparatus, or an HDD (hard disc drive) pre-loaded on the recording and/or reproducing apparatus. The recording/reproducing unit 13 records the TS, supplied from the multiplex/demultiplex circuit 12, on the recording medium 50, and outputs the TS, reproduced from the recording medium 50, to the multiplex/demultiplex circuit 12.

The host CPU 14 performs integrated control on the totality of the functional blocks of the recording and/or reproducing apparatus 100. The host CPU 14 also accesses the SDRAM 15 and the ROM 16, over a host bus, as necessary, to control the overall system.

The MPEG video recorder 17 performs decoding processing on the input video ES to acquire baseband video data to send the so acquired baseband video data to the post video signal processing circuit 18. The structure and the operation of the MPEG video recorder 17 will be explained later in further detail.

The post video signal processing circuit 18 is made up by e.g. a switching circuit, not shown, a field recursive noise reducer and a motion detection video signal interpolation processing circuit and, after switching between picture data supplied from the MPEG video recorder 17 and picture data supplied from the pre-image signal processing circuit 7, executes various processing operations, and sends the resulting picture data to the OSD 19.

The OSD 19 generates the graphic for display on the screen and performs the processing of overlaying on the video data or partial display to send the so processed graphic to the NTSC encoder 20.

The NTSC encoder 20 converts the input picture data (component digital signals) into YC signals and effectuates D/A conversion to acquire analog composite picture signals and S picture signals to input the so acquired signals to a video input terminal provided to the television receiver 200.

The MPEG audio decoder 21 decodes the speech ES signals, supplied from the multiplex/demultiplex circuit 12, to acquire baseband speech signals, which are then supplied to the switching circuit 22.

The switching circuit 22 selects the speech data, supplied from the MPEG audio decoder 21, and the speech data, supplied from the speech A/D converter 9, to output the selected speech data to the speech D/A converter 23.

The speech D/A converter 23 converts the speech data into analog speech signals and sends the so produced analog speech signals to a speech input terminal provided to the television receiver 200.

The signals supplied and output from the digital IN/OUT 24 is now explained. In recording the signals, supplied from e.g. the external IRD (integrated receiver decoder) through the digital IN/OUT 2, as a digital interface, such as IEEE1394, the digital signals are supplied to the digital interfacing circuit 25.

The digital interfacing circuit 25 performs the processing, such as format conversion, in agreement with the present system, to generate a TS, which is then sent to the multiplex/demultiplex circuit 12. The multiplex/demultiplex circuit 12 further analyzes and generates e.g. control signals to transform the TS into a TS adapted to the present system.

Simultaneously, the multiplex/demultiplex circuit 12 performs demultiplexing processing to send the video ES and the speech ES to the MPEG video recorder 17 and to the MPEG audio decoder 21, to produce analog video and speech signals, respectively.

When the recording medium 50 is reproduced by the recording/reproducing unit 13, the reproduced TS is sent to the multiplex/demultiplex circuit 12, as described above. When the TS is supplied to the multiplex/demultiplex circuit 12, the control signals are analyzed and generated, as necessary, and the resulting TS is sent to the digital interfacing circuit 25. The digital interfacing circuit 25 performs the conversion which is the reverse of that at the time of the recording, to transform the TS into digital signals adapted to the external IRD. The resulting signals are output via digital IN/OUT 24.

Simultaneously, the multiplex/demultiplex circuit 12 may perform demultiplexing processing to send the PES to the MPEG video recorder 17 and to the MPEG audio decoder 21, in order to produce analog video and speech signals.

The description of the present embodiment refers to connection with the IRD. Alternatively, connection may be made to an AV apparatus, such as TV, or to a personal computer.

The tuner for EPG 26 for the ground wave operates under control by the host CPU 14, to receive a CH (channel), on which is superimposed the EPG, to send the so received picture signals to the data slicer 27.

The data slicer 27 extracts the EPG data from the input picture signals to send the so extracted EPG data to the host CPU 14. The host CPU 14 analyzes the EPG signal to display the program information on the GUI. The EPG data, acquired from the BS digital or from the ground wave broadcast, is used not only for displaying a program table, but also as the information for title demonstration of the prerecorded programs or timer recording.

Figure 4:
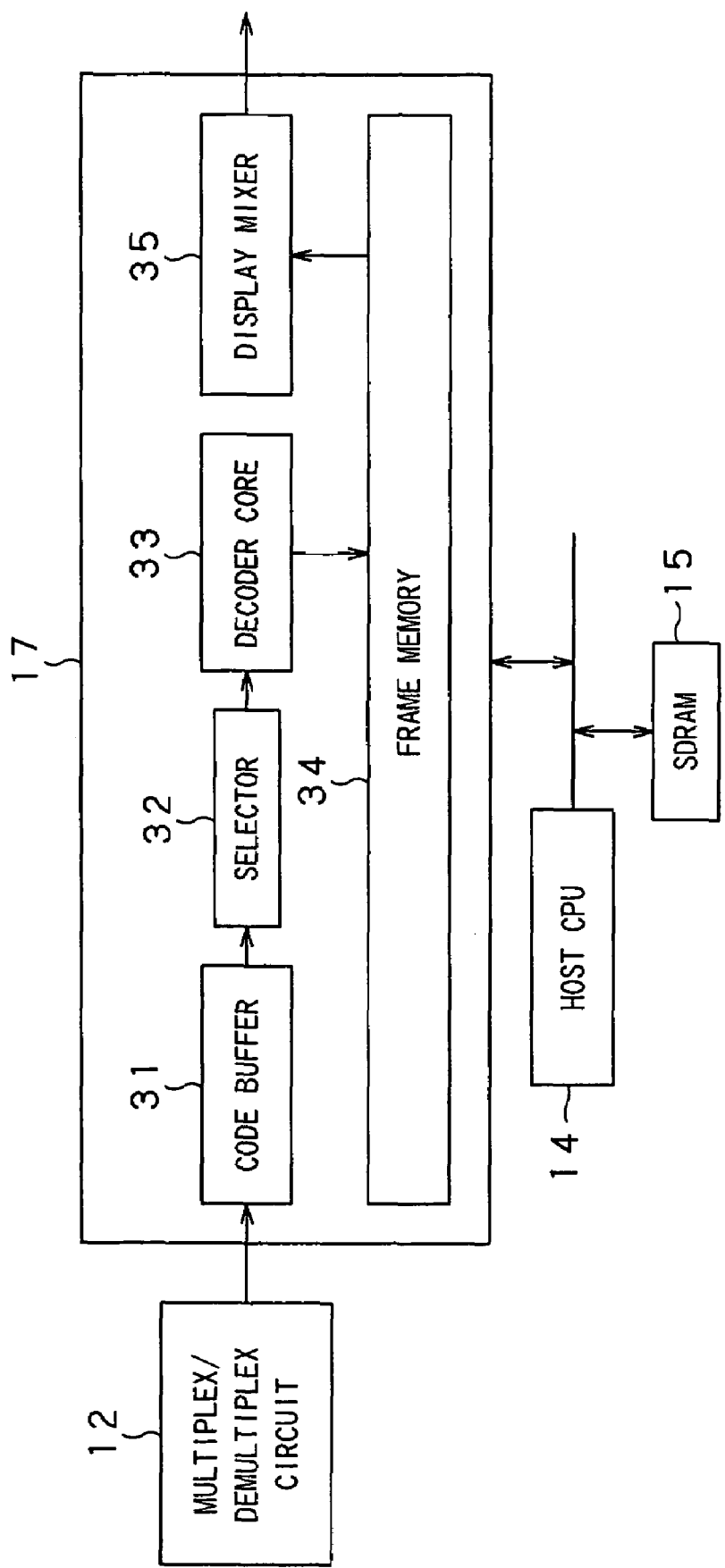
FIG. 4 is a block diagram showing an MPEG video decoder forming the recording and/or reproducing apparatus according to the present invention.

Referring now to FIG. 4, the detailed structure of the MPEG video recorder 17 in the recording and/or reproducing apparatus 100 of the present invention, configured for decoding the TS, supplied through the multiplex/demultiplex circuit 12 from the digital tuner 11 or from the recording medium 50, is now explained.

The MPEG video recorder 17 includes a code buffer 31, a selector 32, a decoder core 33, a frame memory 34 and a display mixer 35.

The code buffer 31 is a buffer for transiently storing, or buffering, a plural number of pictures of the video ES, supplied from the multiplex/demultiplex circuit 12. The code buffer 31 is able to dynamically change its own buffering area, responsive to the number of video ES streams, supplied from the multiplex/demultiplex circuit 12, under control by the host CPU 14, in order to allocate the buffering area to respective input streams.

In case the multi-view broadcast, devised as services rendered by the BS digital broadcast, is received by the digital tuner 11, a TS composed of two or more multiplexed SD streams is supplied to the multiplex/demultiplex circuit 12.

The multiplex/demultiplex circuit 12, supplied with the TS, acquires the PSI, multiplexed on the TS, to send the so acquired PSI to the host CPU 14. The host CPU 14 is advised of the type and the number of the streams, from the PSI supplied from the multiplex/demultiplex circuit 12. In case the video ES supplied is the SD stream, and the number of the streams is two or three, the host CPU 14 controls the code buffer 31 to dynamically change the buffering area to allocate the buffering area to the respective streams.

In case the streams recorded on the recording medium 50 are reproduced and supplied to the multiplex/demultiplex circuit 12, the information on the stream type or the number of the streams, for example, may be acquired from a database constructed in the recording medium 50.

In case the number of the streams recorded on the recording medium is two or three, the selector 32 operates for time-divisionally switching the output from the code buffer 31 to send the selected output to the decoder core 33.

It is noted that, when the HD stream is supplied, or the SD stream is supplied by itself, the selector 32 sends the output of the code buffer 31, without attendant switching operations, to the decoder core 33.

Figure 5:
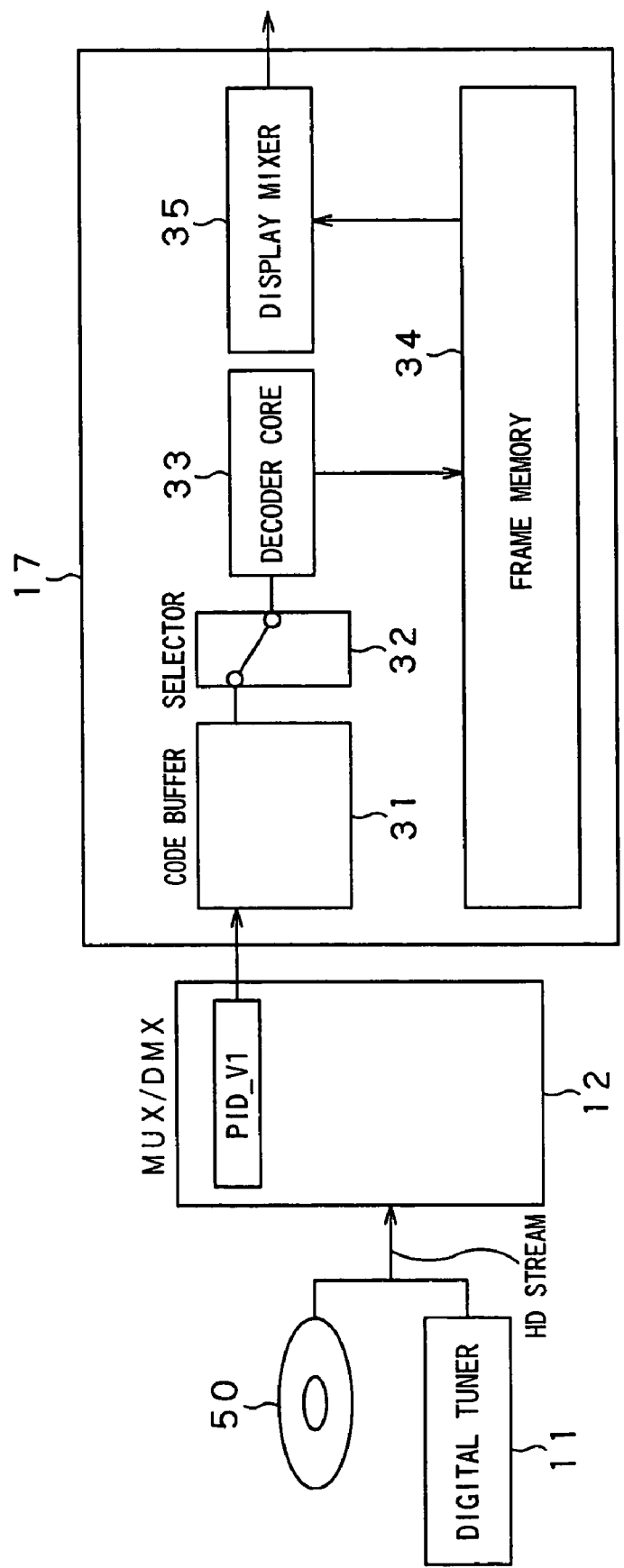
FIG. 5 shows the state of a code buffer and a selector in case an HD stream has been sent to the MPEG video decoder in the recording and/or reproducing apparatus according to the present invention.
Figure 6:
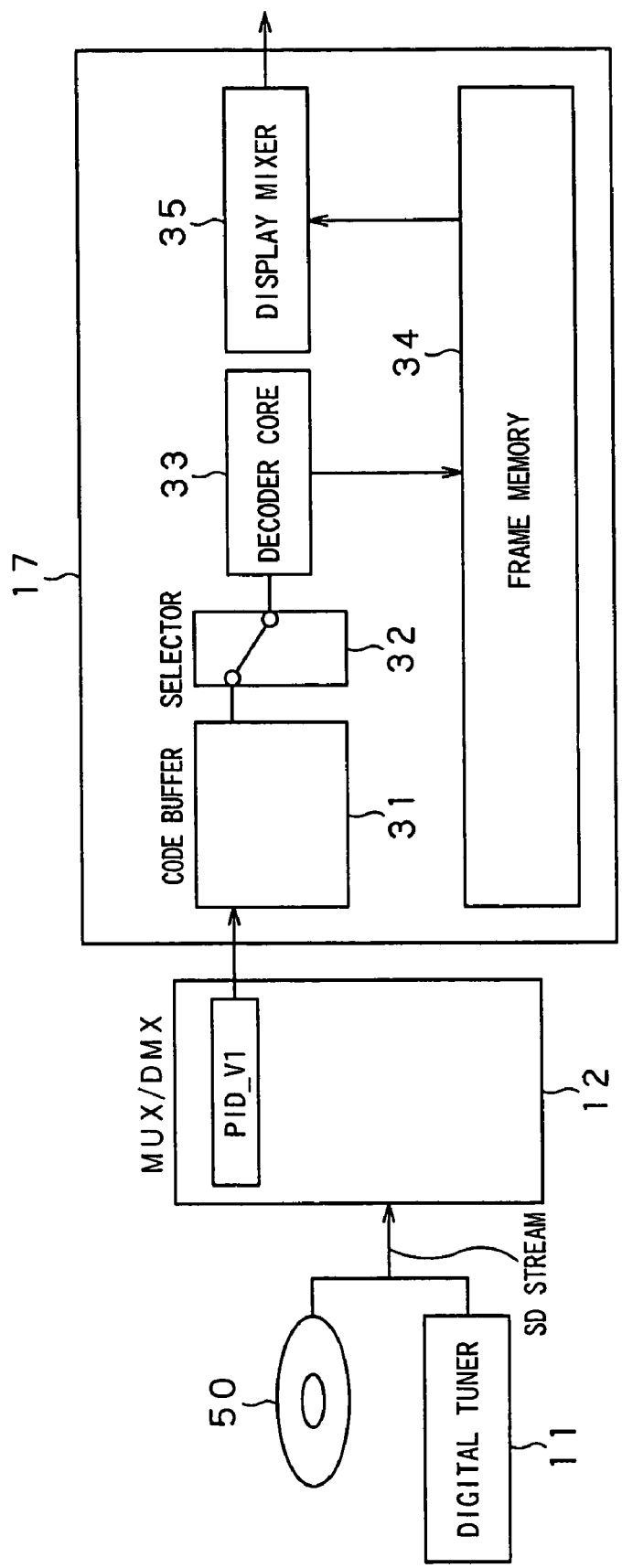
FIG. 6 shows the state of a code buffer and a selector in case an SD stream has been sent to the MPEG video decoder in the recording and/or reproducing apparatus according to the present invention.

For example, when the sole HD stream, or the sole SD stream, is supplied to the MPEG video recorder 17, the MPEG video recorder is in a state shown in FIG. 5 or 6, respectively.

Figure 7:
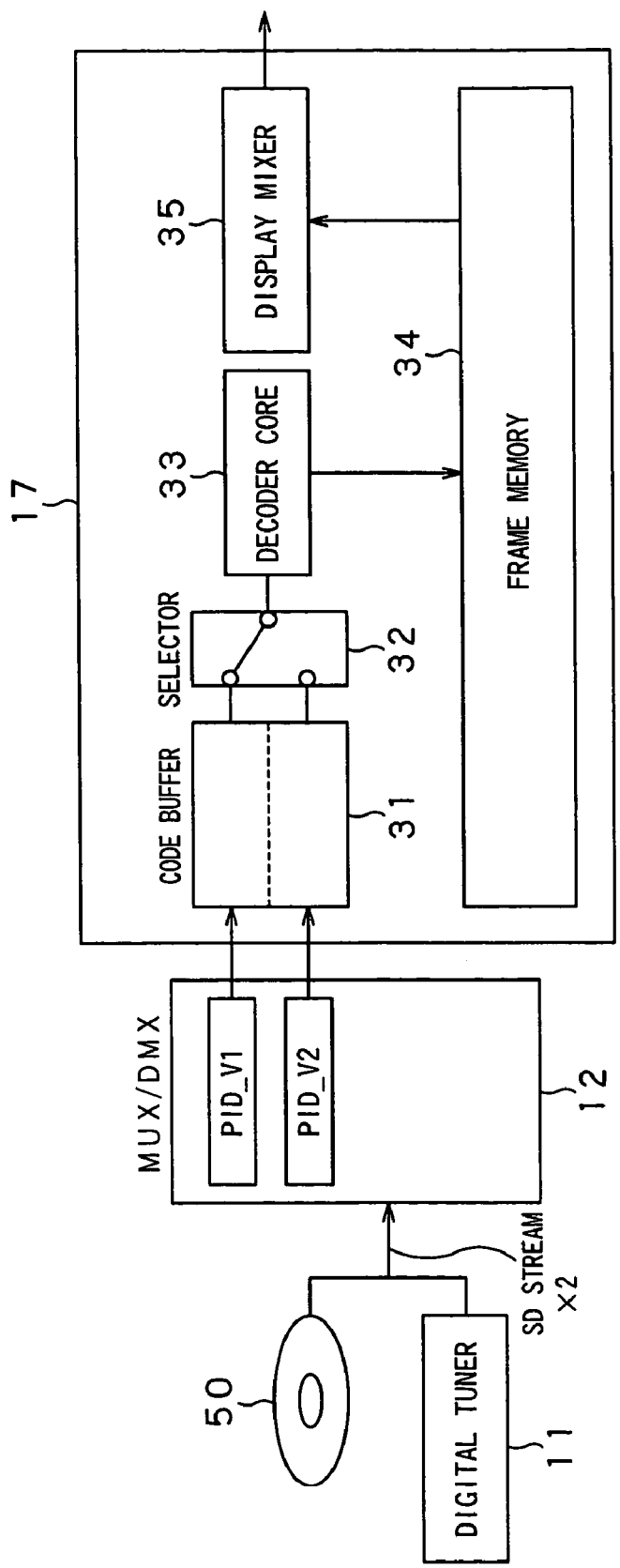
FIG. 7 shows the state of a code buffer and a selector in case two SD streams have been sent to the MPEG video decoder in the recording and/or reproducing apparatus according to the present invention.
Figure 8:
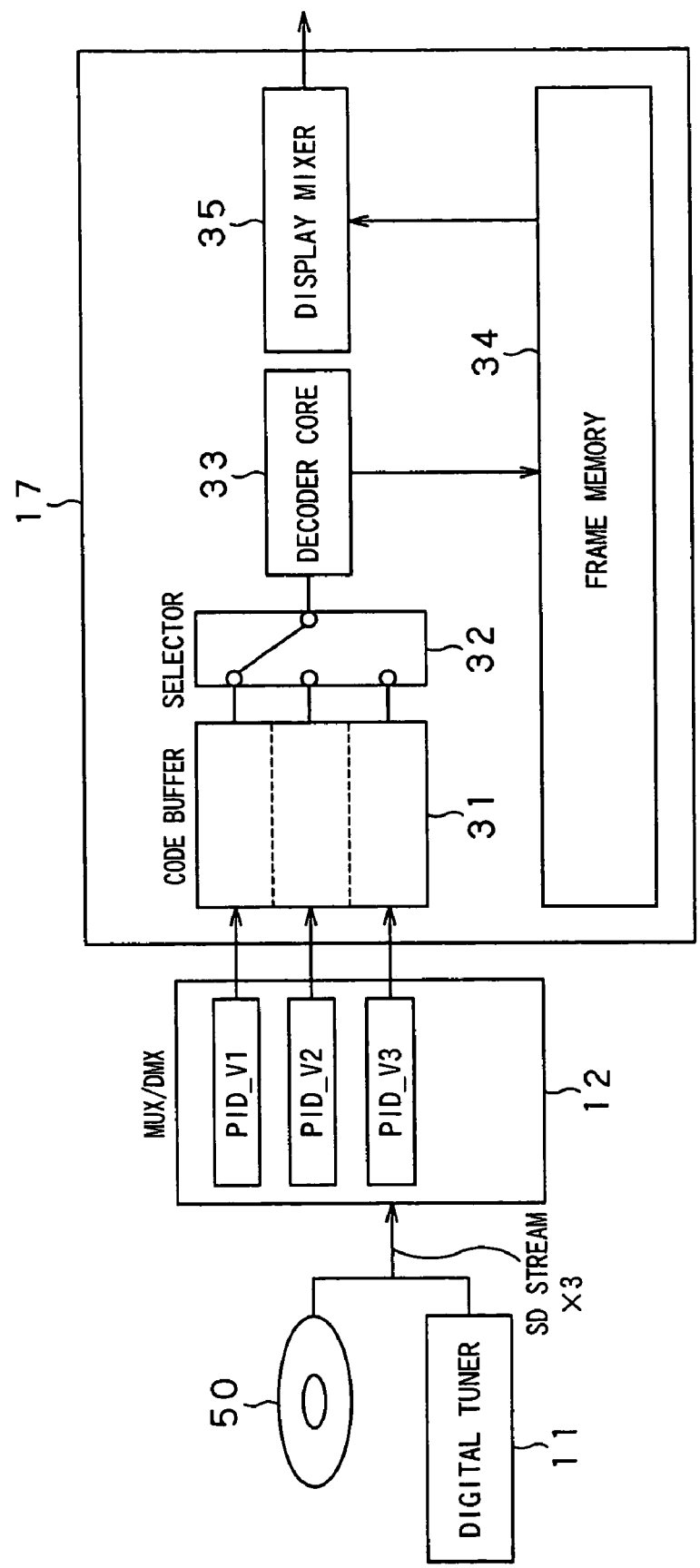
FIG. 8 shows the state of a code buffer and a selector in case three SD streams have been sent to the MPEG video decoder in the recording and/or reproducing apparatus according to the present invention.

On the other hand, in case two SD streams or three SD streams are supplied to the MPEG video recorder 17, the MPEG video recorder is in a state shown in FIG. 7 or 8, respectively. In this case, the buffering area in the code buffer 31 is allocated from one input stream to another, with the selector 32 operating for time-divisionally controlling the input to the decoder core 33.

The streams are discriminated by the PID, such that the two or three SD streams, supplied from the multiplex/demultiplex circuit 12 to the code buffer 31, are supplied to preset buffering areas, again on the basis of the PID.

The decoder core 33 MPEG-decodes the HD and SD streams, supplied on the frame basis from the code buffer 31, to generate picture data. The so generated picture data are supplied to the downstream side frame memory 34.

Meanwhile, in the following explanation, the HD stream and the SD stream, decoded by the decoder core 33, are termed an HD frame and an SD frame, respectively.

The frame memory 34 has a preset storage capacity, specifically, 16 frames for an SD frame and 4 frames for a HD frame, as possible storage capacities, respectively. The frame memory 34 transiently stores the HD frame and the SD frame, decoded by the decoder core 33, in predetermined memory areas thereof, respectively. The HD frame and the SD frame, thus stored, are read out in similar manner, under control by the host CPU 14, so as to be output to the downstream side display mixer 35.

The HD frame and the SD frame, decoded by the decoder core 33 and stored in the frame memory 34, are supervised by the host CPU 14 as to in which memory area of the frame memory 34 the HD frame or the SD frame is stored.

The display mixer 35 sets the positions of the HD and SD frames, read out by the host CPU 14 from the frame memory 34, which positions are those when the HD and SD frames have been output from the recording and/or reproducing apparatus 100 to e.g. the television receiver 200, under control by the host CPU 14. The display mixer then sends the so set positions to a post-image signal processing circuit 18. In particular, when the multi-view broadcast, provided in the BS digital broadcast, is received by the digital tuner 11, the HD and SD frames are positioned, under control by the host CPU 14, so that three frames at the maximum are properly located on the same screen.

The decoding processing in the MPEG video recorder 17, the configuration of which is shown in FIG. 4, does not represent the processing of simply decoding a stream by the decoder core 33, but encompasses storing the stream, decoded by the decoder core 33, as a frame in the frame memory 34.

Thus, when the decoding processing is to be carried out in the MPEG video recorder 17, even the management of the memory area in the frame memory 34, that is, the management as to in which memory area of the frame memory 34 the frame decoded in the decoder core 33 is stored, becomes necessary. The stream decoding in the decoder core 33 is not executed unless there is a void area in the frame memory 34.

Specifically, a management table for comprehensively managing the state of use of the frame memory 34 is provided in the SDRAM 15, in order for the host CPU 14 to have reference to this management table to supervise the void area in the frame memory 34 as well as to control the decoding processing carried out by the decoder core 33. The host CPU 14 also has reference to the management table provided in the SDRAM 15 to control even the outputting of the frame stored in the frame memory 34.

For example, when the sole HD stream or the sole SD stream is supplied to the code buffer 31, it is sufficient if the host CPU 14 sequentially outputs the frames, beginning from a frame stored earlier in the frame memory 34, to procure a void frame area in the frame memory 34 to permit the decoding by the decoder core 33.

In the decoding processing in the multi-view broadcast, the decoder core 33 is used time-divisionally to generate an SD frame from two or three SD streams supplied to the code buffer 31. The respective SD frames, thus generated, are stored in the frame memory 34. It is noted that the two or three SD frames need to be output from the frame memory 34 simultaneously.

Thus, plural SD frames of the different channels, decoded by the decoder core 33, are stored in the memory area of the frame memory 34, so that the host CPU 14 has to grasp the information for distinguishing the channels or the output timing information from the frame memory 34.

Thus, the host CPU 14 has to provide a management table to supervise the state of use of the frame memory 34. The management table, provided by the host CPU 14 in the SDRAM 15, is termed a virtual frame.

The virtual frame, as a management table constructed in the SDRAM 15 by the host CPU 14, is associated with the memory areas in the frame memory 34. The virtual frame reflects the frame storage state in the storage area in the frame memory 34 and holds this frame storage state as the information.

The host CPU 14 permits the decoder core 33 to execute the decoding, based on the virtual memory, which is a management table extended in the SDRAM 15, or controls the outputting of the frames stored in the frame memory 34, to enable correct execution of the decoding processing in the MPEG video recorder 17.

When supervising the decoding processing of the MPEG video recorder 17, using the virtual frame, extended in the SDRAM 15, the host CPU 14 operates as a video decoding manager, a virtual frame manager and as a display manager, from one channel to the next, that is, from one video decoding processing to the next.

The video decoding manager supervises the decoding processing into a frame of the stream(s) supplied to the MPEG video recorder 17. The decoding processing, managed by the video decoding manager, denotes the processing from the procurement of a void area in the frame memory 34 through decoding in the decoder core 33, responsive to the procurement of the void area, up to decision of the display sequence of the frames decoded by the decoder core 33 and stored in the void areas in the frame memory 34. The management of the decoding processing of the host CPU 14, as a video decoding manager, is carried out in its entirety via the virtual frame extended in the SDRAM 15 as a management table.

When decoding a stream, the video decoding manager requests the virtual frame manager, actually supervising the virtual frame, to retrieve whether or not there is any void area, depending on the stream type, that is, depending on whether the stream is the HD stream or the SD stream. In case there is such void area in the virtual frame, the video decoding manager procures the void area to exercise control to cause the picture decoding to be performed in the memory area of the frame memory 34 associated with the void area of the virtual frame.

The video decoding manager also supervises the display sequence responsive to a request for special reproduction (reproduction in reverse) in which the display sequence differs from the decoding sequence (e.g. Slow R, Step R, FR). The display sequence management by the video decoding manager is carried out, using the virtual frame, as a management table, such as by imparting the numbering information of the display sequence, conforming to the user's request, to the virtual frame corresponding to the frame memory 34, in which the frame is stored.

The display manager manages and executes the display processing, based on the display sequence of the decoded frames as determined by the video decoding manager. The display manager executes the display processing, based on the information stated in the virtual frame, which is the management table.

For example, the display manager retrieves a frame, which may be displayed, among the virtual frames, from one VSync interrupt to another, to select and display the frame coincident with the display condition. The display manager also sorts the frames, already displayed, to return the virtual frames, determined to be not needed as from that time, to the virtual frame manager. In this manner, the virtual frame becomes a void area. The frame actually stored in the memory area of the frame memory 34 is displayed in a manner consistent with the memory area in the frame memory 34 becoming a void area.

The virtual frame manager executes management of the virtual frame, which is a management table of the frame memory 34 as extended in the SDRAM 15. The virtual frame manager supervises the virtual frames, while grasping the virtual frames usable in the channel.

For example, the virtual frame manager is responsive to a request from the video decoding manager as to whether or not there is any void area in the virtual frame to retrieve the void area from the virtual frame or to free the virtual frame returned from the display manager.

By the control by the host CPU 14 employing the virtual frames extended on the SDRAM 15, the MPEG video recorder 17, described above, is able to decode the HD stream and the SD stream, supplied from the multiplex/demultiplex circuit 12, into a HD stream and a SD stream, respectively, to output the so produced HD and SD streams.

Figure 9:
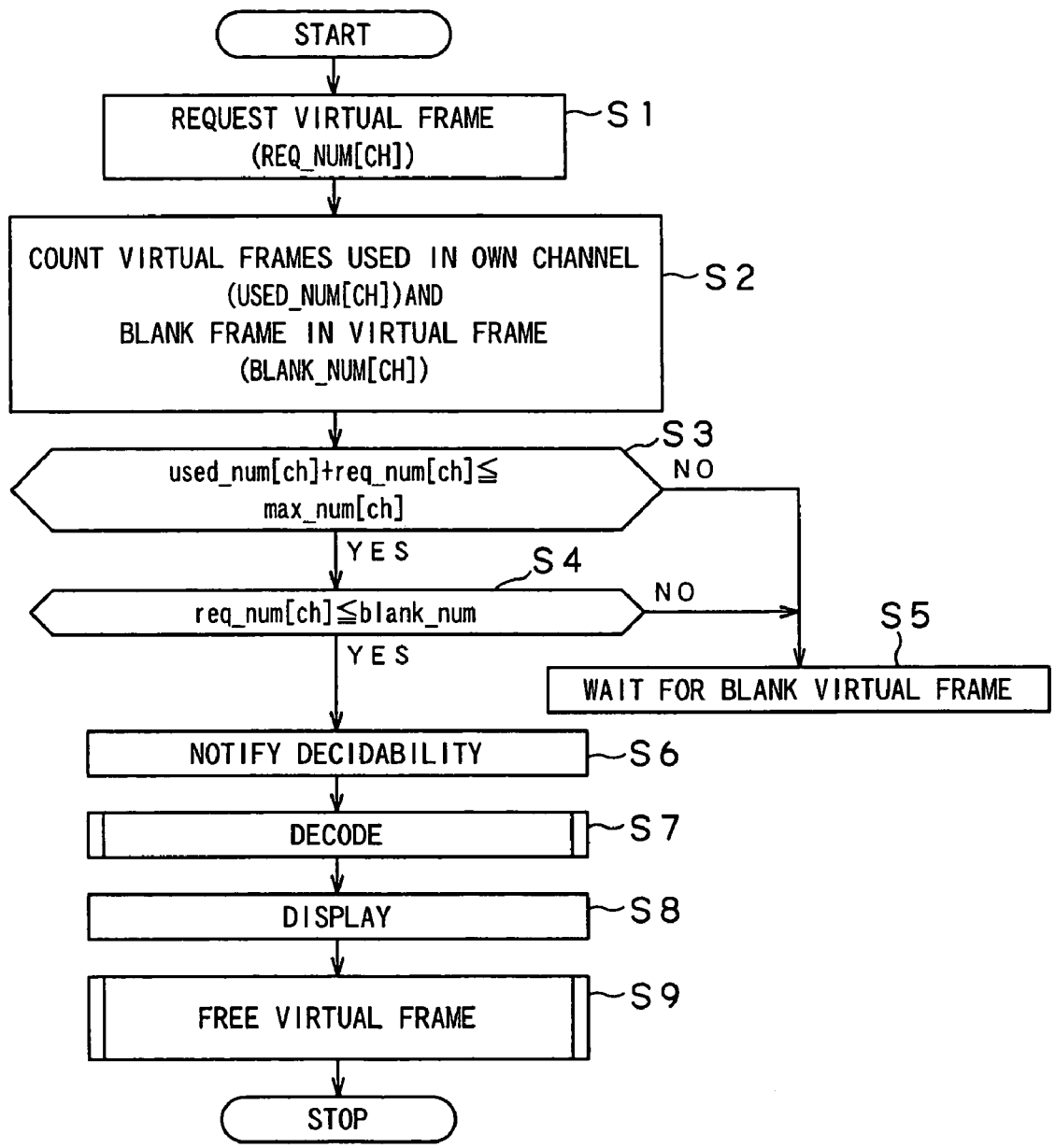
FIG. 9 is a flowchart showing the operation of MPEG video decoder in the recording and/or reproducing apparatus according to the present invention.
Figure 10:
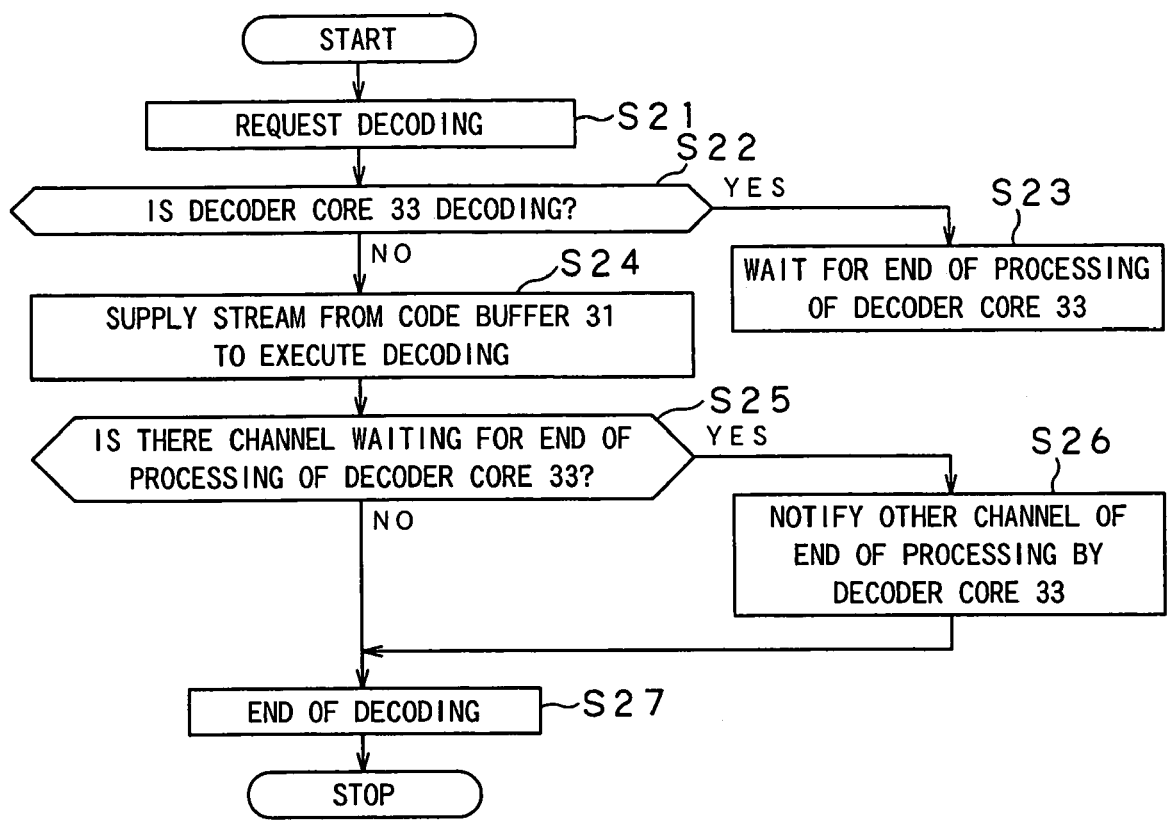
FIG. 10 is flowchart showing the decoding processing of the MPEG video decoder.
Figure 11:
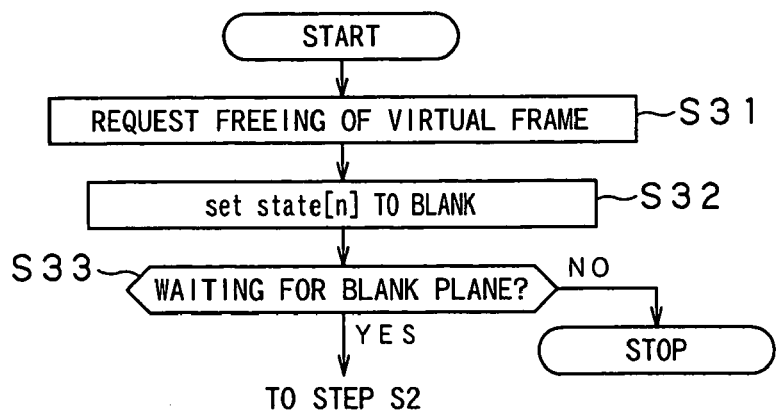
FIG. 11 is a flowchart showing the operation of freeing an imaginary frame.

Referring to the flowcharts, shown in FIGS. 9 to 11, the decoding processing by the MPEG video recorder 17 is now explained.

The decoding processing of plural channels in the MPEG video recorder 17 is an independent operation, as a decoding processing in each channel, except the time-divisional decoding processing and the co-owning of the frame memory.

Thus, although the decoding processing of the respective channels is carried out in effect by the MPEG video recorder 17, having only the sole decoder core 33, the decoding processing may be explained as a model in which the processing by plural decoders, provided independently from one channel to another, is presupposed.

In the above-described decoding processing by the MPEG video recorder 17, the decoding processing over two or three channels, corresponding to the multi-view broadcast, provided by the BS digital broadcast, may be deemed as a processing by an independent decoder and modeled as such. Thus, the decoding processing over a sole channel is explained, by way of explaining the operation of the decoding processing of the MPEG video recorder 17.

First, in a step S1 in FIG. 9, the video decoding manager of a given channel is responsive to the supply of a stream to the MPEG video recorder 17 to request the virtual frame manager a number of virtual frames, corresponding to the number of the frames as required in decoding, from the virtual frames, which are the management table extended on the SDRAM 15. The number of the requested virtual frames is denoted as (req_num[ch]).

In a step S2, the virtual frame manager of the channel is responsive to a request by the video decoding manager of the given channel to retrieve the virtual frames, extended on the SDRAM 15, to count the number of the virtual frames used in the channel (used_num[ch]) and the number of the virtual frames which are usable for the channel and which are not in use (blank_num[ch]).

If, in a step S3, the sum of the number of the virtual frames used in the channel (used_num[ch]) and the number of the virtual frames requested by the video decoding manager (req_num[ch]) is not larger than the maximum number of the virtual frames usable for decoding processing in the channel (used_num[ch]+ req_num[ch] ≦max_num [ch]), the virtual frame manager proceeds to a step S4 and, if the sum exceeds the maximum number, the virtual frame manager proceeds to a step S5.

If, in a step S4, the number of the requested virtual frames (req_num[ch]), that is, the number of the virtual frames requested by the video decoding manager, is not larger than the number of frames (blank_num[ch]), that is, the number of the virtual frames usable but not used in the channel, the virtual frame manager proceeds to a step S6. If the number of the requested virtual frames (req_num[ch]) exceeds the number of the virtual frames not used in the channel, the virtual frame manager proceeds to a step S5.

In the step S5, the virtual frame manager is responsive to the conditions not being met, as evidenced by the result of decision processing in the steps S3 and S4, to determine that there lacks in the frame memory 34 the area in which to store the frame decoded by the decoder core 33 in the channel. The virtual frame manager then is in a waiting state for procuring the area usable for the decoding processing.

In the step S6, the virtual frame manager is responsive to the conditions being met, as evidenced by the result of decision processing in the steps S3 and S4, to determine that there is in the frame memory 34 the area in which to store the frame decoded by the decoder core 33 in the channel. The virtual frame manager then communicates that effect to the video decoding manager.

In the step S7, the video decoding manager is responsive to the communication in the step S6 that the storage area in the frame memory 34 of the frame decoded by the virtual frame manager has been procured and that decoding processing by the decoder core 33 is possible (this communication is termed below as request for decoding processing) to execute the processing of decoding by the MPEG video recorder 17.

Referring to the flowchart of FIG. 10, the operation of the processing of decoding in the step S7 of the flowchart of FIG. 9 is now explained.

In a step S21, the video decoding manager receives a decoding processing request from the virtual frame manager.

In a step S22, the video decoding manager checks to see if the video decoder core 33 is currently performing the processing of decoding. Since there is only one video decoder core 33 in the MPEG video recorder 17 that actually performs the processing of decoding, it is only possible to carry out the processing of video decoding of one channel at a time. It is therefore necessary to give a decision in the step S22 whether or not the decoder core 33 is in use.

When the video decoder core 33 is currently performing the processing of decoding, the video decoding manager proceeds to a step S23. If otherwise, the video decoding manager proceeds to a step S24.

In the step S23, the video decoding manager is responsive to the decoder core 33 currently performing the processing of decoding to transfer to a standby state of awaiting the termination of the processing of the decoder core 33.

In the step S24, the video decoding manager is responsive to the decoder core 33 not performing the processing of decoding to control the selector 32 to cause the stream of the channel, buffered by the code buffer 31, to be properly sent to the decoder core 33.

The decoder core 33 is responsive to the delivery thereto of the stream from the code buffer 31 through the selector 32 to execute the processing of decoding the supplied stream into a frame. The decoder core 33 decodes the stream on the frame basis. The frame generated on decoding by the decoder core 33 is stored in a relevant memory area in the frame memory 34, based on the management processing employing the virtual frame expanded in the SDRAM 15.

Meanwhile, in case the stream, performing the processing of decoding, is a picture in need of a reference picture (P-picture or B-picture), the reference picture is retrieved from the frame memory 34 and, using the so retrieved reference picture, the processing of decoding is executed. In retrieving the reference picture, the virtual frame, as a management table, is used.

In a step S25, the video decoding manager is responsive to completion of the decoding processing in the decoder core 33 to check to see whether or not there is any channel awaiting the termination of the processing of decoding by the decoder core 33. If there is any channel awaiting the termination of the decoding processing, the video decoding manager proceeds to a step S26. Should there be no awaiting channel, the video decoding manager proceeds to a step S27.

In the step S26, the video decoding manager communicates the effect of the termination of the processing of decoding of the channel by the decoder core 33 to the video decoding manager of the channel awaiting the termination of the decoding processing.

In the step S27, the video decoding manager is responsive to there being no channel awaiting the termination of the decoding processing of the channel in question to terminate the entire process of the decoding processing.

When the process in the step S27 comes to a close, reversion is made to the flowchart of FIG. 9 to execute the display processing of step S8 and the processing of setting the virtual frame free in the step S9.

In the step S8, the display manager refers to the information stating the display sequence as held by the virtual frame as the management table, each time the video synchronization signal (VSync) as a display timing of a frame stored in the frame memory 34 is generated. The display manager reads out the frame, determined to be displayed by the virtual frame, from the associated frame memory 34, to locate the frame at an optional position on the display mixer 35.

The frame determined to be displayed from the virtual frame by the display manager differs depending on the mode of reproduction, such that, in case of normal reproduction, such a frame having a PTS (presentation time stamp) coincident with the STC (system timing clock) is selected. In case of Slow R, representing special reproduction, a frame temporally one picture ahead of the frame currently displayed is selected.

If, in reproducing plural SD streams, the SD frame, which has decoded the SD stream, is displayed on mixing by the display mixer 35, the frames are located so as not to be overlapped together.

In the step S9, the display manager is responsive to the outputting to the display mixer 35 of the frame processed for decoding and stored in the preset storage area in the frame memory 34 to execute the processing of freeing the virtual frame associated with the predetermined memory area of the frame memory 34.

When the processing of setting the virtual frames free is carried out, the predetermined virtual frames, among the virtual frames, expanded on the SDRAM 15, become void virtual frames. This processing is in meeting with the memory area of the frame memory 34, associated with the virtual frame, now evacuated, becoming a void memory area as a result of the outputting of the stored frame to the display mixer 35.

Referring to the flowchart, shown in FIG. 11, the operation of freeing the virtual frame area is now explained.

First, in a step S31, the display manager is responsive to the outputting to the display mixer 35 of the frame stored in the predetermined memory area of the frame memory 34 to request the virtual frame manager to free the virtual frame associated with the preset memory area.

In a step S32, the virtual frame manager sets the status information (state[n]) of the virtual frame, requested to be freed by the display manager, to "BLANK", indicating that the frame is the void virtual frame.

In a step S33, the virtual frame manager verifies whether or not the virtual frame has been requested from the video decoding manager. If no request for the virtual frame has been made to the virtual frame manager, the process comes to a close. If the request for the virtual frame has been made, the virtual frame manager proceeds to the step S2 in the flowchart shown in FIG. 9 in order to carry out the process as from the step S2 again.

The MPEG video recorder 17 is composed in this manner of the sole decoder core 33 and the frame memory 34. However, even in case the decoding processing for plural channels is needed, as in the case of the multi-view broadcast, the processing of decoding can be realized by supervising the frame memory 34, with the use of the virtual frame, as a management table, by the virtual frame manager, and by time-divisionally employing the decoder core 33 under control by the video decoding manager of the host CPU 14.

A more specified management technique by the host CPU 14, employing the virtual frame constructed in the SDRAM 15, is now explained.

Figures 12A, 12B, 12C:
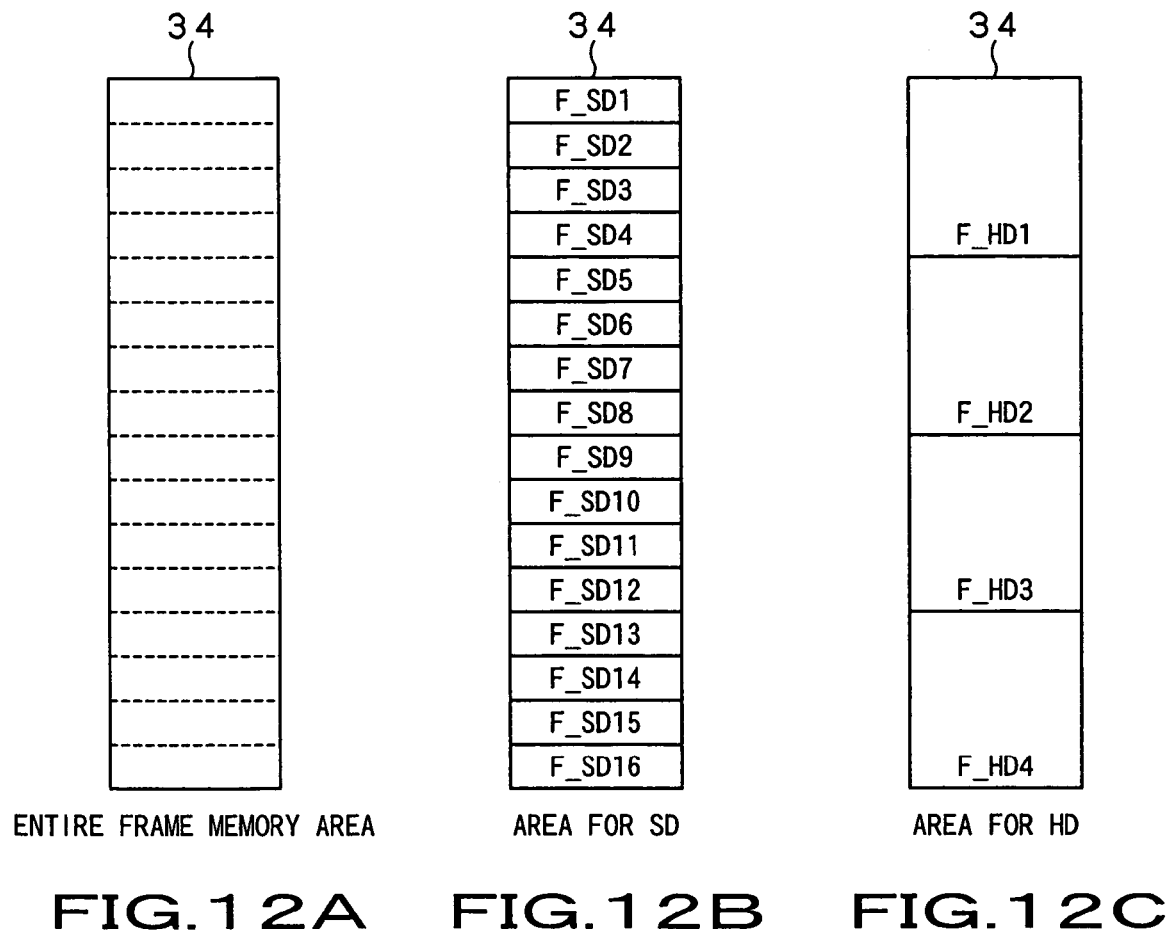
FIG. 12A illustrates a total memory area of a frame memory in a recording and/or reproducing apparatus according to the present invention.
FIG. 12B shows a memory area in case the frame memory is defined for SD.
FIG. 12C shows a memory area in case the frame memory is defined for HD.

Before proceeding to explanation of the management technique by the host CPU 14, the memory areas of the frame memory 34 of the MPEG video recorder 17 are defined as shown in FIGS. 12A to 12C. The entire memory areas of the frame memory 34 are shown in FIG. 12A.

The frame memory 34 is defined as being able to store 16 SD frames, as a frame memory for SD frames, as shown in FIG. 12B. On the other hand, the frame memory 34 is defined as being able to store 4 SD frames, as a frame memory for SD frames, as shown in FIG. 12C.

If the frame memory 34 is defined as shown in FIGS. 12B and 12C, the memory area needed for storing the HD frames is four times the memory area needed for storage of the SD frames.

Figure 13:
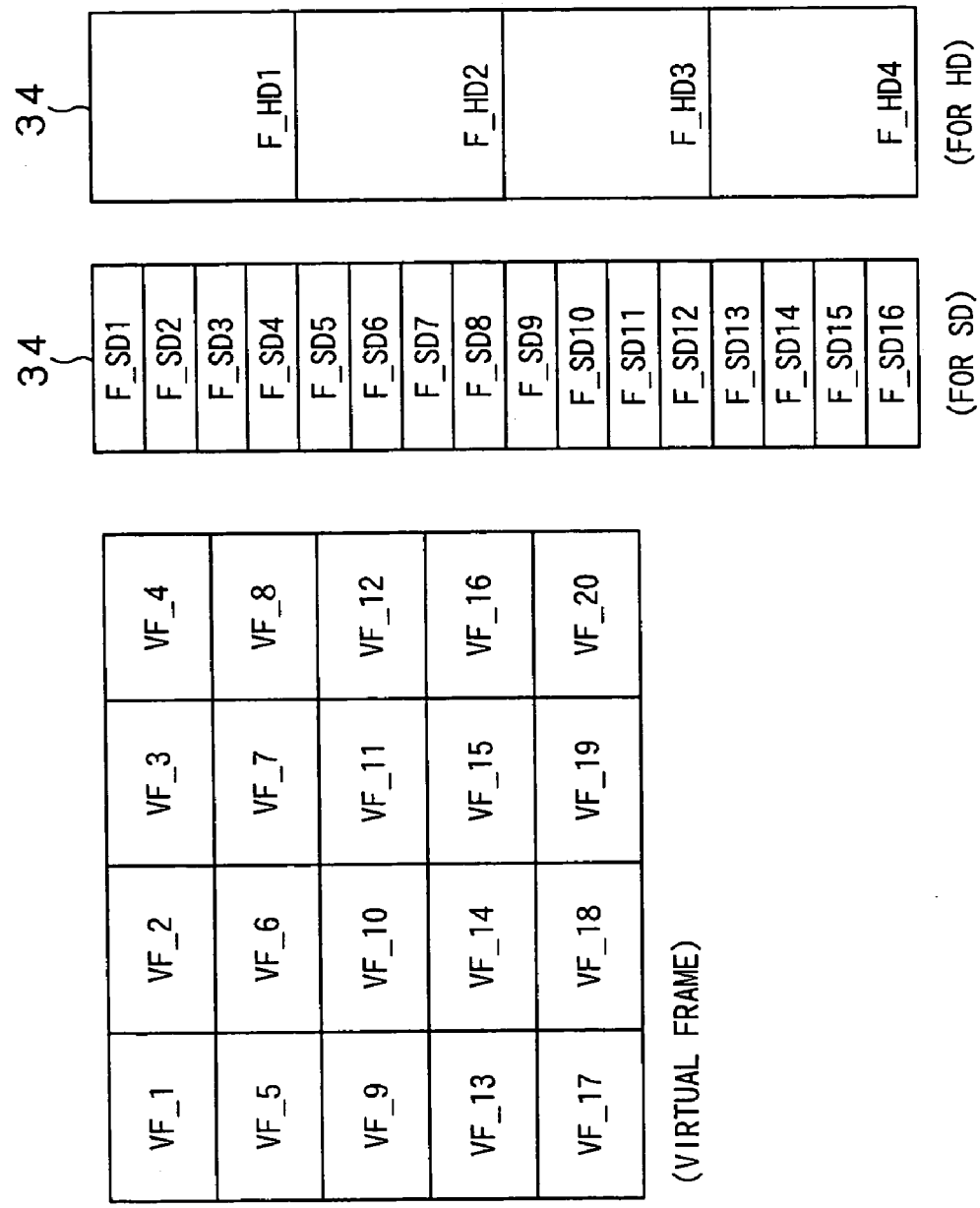
FIG. 13 illustrates the state of correspondence between the frame memory and a virtual frame.

Then, referring to FIG. 13, the virtual frames, as a management table constructed in the SDRAM 15, is caused to correspond to the memory area in the frame memory 34.

The virtual frames, constructed in the SDRAM 15, needs to be constructed so that it is possible to simultaneously comprehend both the case of using the frame memory 34 as a frame memory for SD and the case of using the frame memory 34 as a frame memory for HD.

By constructing the virtual frame in this manner, it is possible to carry out seamless switching between the multi-view broadcast and the digital high definition television broadcast at a switching point therebetween in case three SD streams, referred to below as 3SD streams, are supplied to the MPEG video recorder 17 for reproducing the multi-view broadcast and subsequently the HD stream is supplied thereto for reproducing the digital high definition television broadcast.

For example, there are constructed in the SDRAM 15 virtual frames caused to correspond to the memory area in the frame memory 34, as shown in FIG. 13.

Since there are cases where the frame memory 34 is used as a frame memory for SD and where the frame memory 34 is used as a frame memory for HD, the information for these two cases need to be acquired simultaneously.

For this reason, the virtual frame for SD and the virtual frame for HD are constructed in the SDRAM 15. That is, the maximum number of the virtual frames in case of using the frame memory 34 for SD plus the maximum number of the virtual frames in case of using the frame memory 34 for HD are constructed in the SDRAM 15.

For example, when the frame memory 34 is used for SD, 16 SD frames may be stored in the frame memory 34, whereas, when the frame memory 34 is used for HD, 4 HD frames may be stored in the frame memory 34, so that 20 virtual frames may be constructed in the SDRAM 15.

With the 20 virtual frames VF_1 to VF_20, constructed in the SDRAM 15, these virtual frames correspond to F_SD1 to F_SD16, representing the memory areas of the frame memory 34 for SD, and to F_HD1 to F_HD4, representing the memory areas of the frame memory 34 for HD, as specified below.

That is, F_HD1 to F_HD4, representing the memory areas of the frame memory 34 for HD, are in one-for-one correspondence to the VF_1 to VF_4 of the virtual frames, while F_SD1 to F_SD16, representing the memory areas of the frame memory 34 for SD, are in one-for-one correspondence to the VF_1 to VF_20 of the virtual frames.

The virtual frames, constructed in the SDRAM 15, hold a certain number of management information for executing the management of the frame memory 34. These management information are exemplified by the memory area information, specifying the memory area of the frame memory 34, associated with the virtual frames, as described above, and the status information, specifying the current status of the virtual frames.

The status information is "BLANK", "ALLOC", "DEC", and "PRSN" in case the virtual frame is in a state that can be procured for decoding, in case the virtual frame is in a state that has been procured for decoding, in case the virtual frame has already been decoded, and in case the virtual frame is in a state that can be displayed, respectively.

The host CPU 14 is able to refer to the status information, held by the virtual frames, in order to comprehend the current status of the corresponding frame memory 34.

For example, when the status information of the virtual frame VF_1, constructed in the SDRAM 15, is "BLANK", it indicates that the memory area F_HD1 of the frame memory 34 can be procured for decoding. In case the status information of VF_5 is "ALLOC", it indicates that the memory area F_HD1 of the frame memory 34 has been procured for decoding. In case the status information of VF_13 is "DEC", it indicates that the frame already decoded has been stored in the memory area F_SD9 of the frame memory 34 and, in case the status information of VF_17 is "PRSN", it indicates that the frame that can be displayed has been stored in the memory area F_SD13 of the frame memory 34.

In decoding a stream in the MPEG video recorder 17, the host CPU 14 procures a necessary decoding area from the memory area of the frame memory 34, depending on the stream type, such as the SD- or HD stream, and subsequently causes the decoder core 33 to execute the decoding. The host CPU 14 procures the decoding area, needed for carrying out the decoding processing, using the virtual frames, representing the management table constructed in the SDRAM 15.

In decoding a stream, the host CPU 14 first retrieves the totality of the virtual frames, constructed in the SDRAM 15, to procure the virtual frames the status information for which is the "BLANK".

Specifically, the virtual frames are associated with preset memory areas in the frame memory 34, so that, when the HD stream is supplied to the MPEG video recorder 17, and the host CPU 14 has procured any of the virtual frames VF_1 to VF_4, from among the virtual frames constructed in the SDRAM 15, the memory area in the frame memory 34, capable of decoding the HD streams associated with the so procured virtual frames, has been procured.

However, if the memory area of the frame memory 34, associated with the virtual frames VF_1 to VF_4, is to be procured, it is necessary to procure not only the status information of the virtual frames VF_1 to VF_4, but also to confirm the status information of the virtual frames VF_5 to VF_20.

The frame memory 34 is defined both for the HD and for the SD, as described above. If the frame memory is defined for HD, its memory area, that is a memory area of the frame memory 34, capable of storing an SD frame, is four successive memory areas of the frame memory 34, each of which is capable of storing an SD frame.

Thus, the status information of the virtual frames VF_1 to VF_4, by itself, is insufficient in procuring the memory area of the frame memory 34 in decoding the HD streams. By simultaneously confirming the status information of the virtual frames VF_5 to VF_20, it may be seen that the memory area of the frame memory 34, procured on the basis of the status information of the virtual frames VF_1 to VF_4, is completely void.

The same applies when the SD stream is to be decoded. In such case, the host CPU 14 refers to the status information of the virtual frames VF_5 to VF_20 and to the status information of the virtual frames VF_1 to VF_4 to check to see if there is or there is not the void area necessary in decoding the SD streams.

Figure 14:
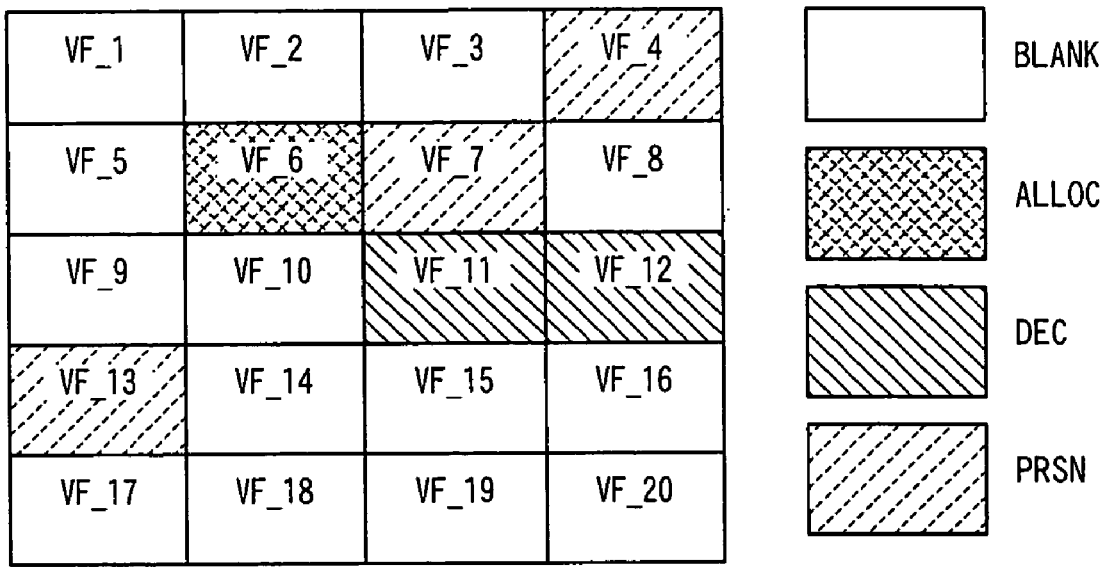
FIG. 14 shows an example of the virtual frame.

Then, using an instance of the virtual frames, constructed in the SDRAM 15 shown in FIG. 14, it is verified whether or not the HD stream is decodable or the SD stream is decodable.

First, the case in which the HD stream is supplied to the MPEG video recorder 17 is verified.

Turning to the virtual frames VF_1 to VF_4 for HD, VF_4 has the status information "PRSN" and is used for demonstration, so that it cannot be used for decoding the HD stream.

As for the remaining virtual frames VF_1 to VF_3 for HD, the status information is "BLANK", so that these virtual frames may possibly be used for decoding the HD stream.

However, in case the frame memory 34 is defined as a frame memory for SD, the status information of VF_6, among the VF_5 to VF_8, co-owning the memory area of the frame memory 34 associated with the virtual frame VF_1, is "ALLOC", while the status information of VF_7 is "PRSN", and hence VF_1 cannot be used for decoding the HD stream.

In similar manner, in VF_2, the status information of VF_11 and VF_12, among the VF_9 to VF_12 co-owning the memory area of the frame memory 34, is "DEC", so that VF_2 cannot be used for decoding the HD stream.

In VF_3, the status information of VF_13, among the VF_13 to VF_16 co-owning the memory area of the frame memory 34, is "PRSN", so that VF_3 cannot be used for decoding the HD stream.

Thus, it may be seen that the MPEG video recorder 17 is not in a position of decoding the HD stream from the virtual frames shown in FIG. 14.

Then, using an instance of the virtual frame, constructed in the SDRAM 15 shown in FIG. 14, such a case is verified, in which the SD stream is supplied to the MPEG video recorder 17.

Turning to VF_5 to VF_20, as virtual frames for SD, the status information of VF_5, VF_9, VF_10 and VF_14 to VF_20 is "BLANK".

Turning to VF_1 to VF_4, the status information of VF_4 is "PRSN", and hence the VF_17 to VF_20 cannot be used for decoding the SD stream.

On the other hand, the status information of VF_1 to VF_3 is "BLANK", so that VF_5, VF_8, VF_9, VF_10 and VF_14 to VF_16 can be used for decoding the SD stream.

Thus, it may be seen that, from the virtual frames, shown in FIG. 14, the MPEG video recorder 17 is able to decode the SD stream.

Figure 15:
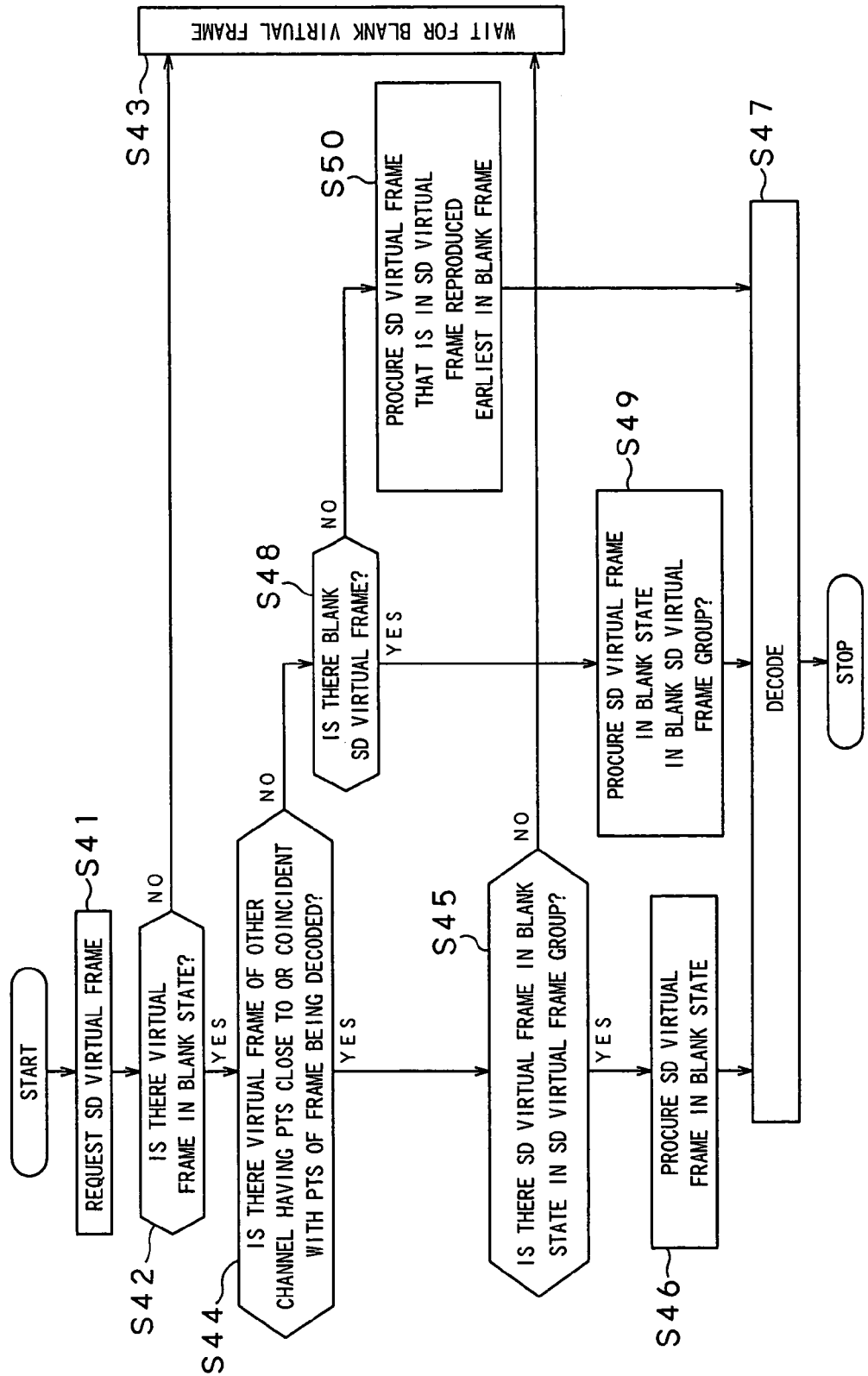
FIG. 15 is a flowchart showing the management operation of a host CPU employing the virtual frame in case of decoding the multi-view broadcast.

Referring now to the flowchart shown in FIG. 15, the decoding supervising operation, employing the virtual frames, in reproducing the multi-view broadcast of BS digital broadcast, is explained. In the following explanation, it is assumed that three SD streams (3SD streams) are sent as multi-view broadcast to the MPEG video recorder 17, and that these SD streams are decoded via channels 1 to 3.

It is also assumed that the SD frames, decoded over the channel 1, are V_ch1, V_ch1_2, V_ch1_3 and V_ch4, the SD frames, decoded over the channel 2, are V_ch2_1, V_ch2_2, $V_{13}$ ch2$_{13}$ 3 and $V_{13}$ ch2$_{13}$ 4, and the SD frames, decoded over the channel 3, are V_ch3_1, V_ch3_2, V_ch3_3 and $V_{13}$ ch3$_{13}$ 4. It is moreover assumed that the numbers affixed, other than the channel numbers (ch1, ch2 and ch3) of the SD frames of the respective channels, denote the PTS, for convenience sake, and that the numbers which remain the same from one channel to the next indicate the same presentation time stamp (PTS) or proximity of the presentation time stamps.

The processing of decoding of the respective channels may be comprehended as being executed independently, as discussed above. Thus, the following explanation is centered about the processing of decoding in one channel.

First, in a step S41, the host CPU 14 is responsive to the supply of the SD stream to request virtual frames required in the processing of decoding in the channel.

In a step S42, the host CPU 14 refers to the virtual frames, constructed in the SDRAM 15, to detect whether or not there is any virtual frame in which the status information is "BLANK". If there is any such virtual frame in which the status information is "BLANK", the host CPU 14 proceeds to a step S44 and, if there is no such virtual frame in which the status information is "BLANK", the host CPU 14 proceeds to a step S43.

In the step S43, the host CPU 14 is in a standby state of awaiting the status information of a virtual frame becoming "BLANK", with the void virtual frame thus being produced.

In the step S44, the host CPU 14 detects the PTS, which is the time management information of the replay output, from the SD stream supplied to the memory area of the code buffer 31, procured for the channel in question.

From the virtual frames for SD, procured for decoding processing for other channels than the channel in question, the host CPU 14 retrieves the virtual frame for SD having the PTS in proximity to or coincident with the PTS as detected from the channel in question.

Figure 16:
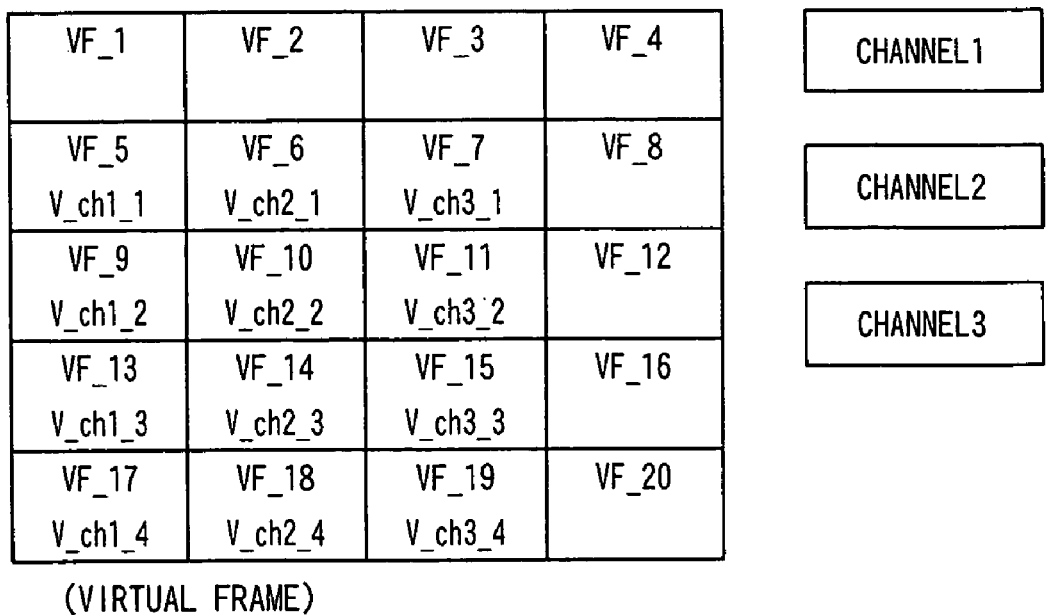
FIG. 16 shows an example of the virtual frame used in explaining the operation of the flowchart shown in FIG. 15.

For example, it is assumed that the virtual frame is as shown in FIG. 16 and that the PTS of V_ch3_4, decoded in the channel 3, has been detected in the step S44.

It is also assumed that, in the virtual frames, shown in FIG. 16, the status information of the virtual frames VF_1 to VF_4 for HD is "BLANK" and that the status information of the virtual frames VF_8, VF_12, VF_16, VF_19 and VF_20 for SD is "BLANK".

The host CPU 14 refers to the virtual frames, constructed in the SDRAM 15, as shown in FIG. 16, to retrieve the virtual frames for SD for the other channels, having the PTS close to or coincident with the PTS of V_ch3_4. In the virtual frames, shown in FIG. 16, it is shown that V_ch1_4 of the channel 1 and V_ch2_4 of the channel 2, having the PTS close to or coincident with the PTS of V_ch3_4 of the frame memory 34, corresponding to VF_17 and VF_18 for SD, are stored in the virtual frames VF_17 and VF_18. Thus, it may be seen that the relevant virtual frames for SD are VF 17 and VF_18.

If there is the relevant virtual frame, the host CPU proceeds to a step S45 and, if otherwise, to a step S48.

In the step S45, the host CPU 14 identifies the virtual frame for SD of the other channel, having the PTS close to or coincident with the PTS of the channel in question, as retrieved in the step S44, and the virtual frame for HD co-owning the memory area of the frame memory 34.

For example, in the case of the virtual frames, shown in FIG. 16, the virtual frames VF_17 and VF_18 for SD are identified in the step S44. It may be seen that the virtual frame for HD, co-owning the memory area of the frame memory 34 with this virtual frame for SD, is VF_4.

The host CPU 14 then retrieves, from the virtual frames for SD, co-owning the memory area of the frame memory 34 with the so identified virtual frame for HD, whether or not there is any virtual frame for SD having the status information of "BLANK".

In the case of the virtual frames, shown for example in FIG. 16, the virtual frames for SD, co-owning the memory area of the frame memory 34 with the identified virtual frame for HD VF_4, are VF_17 to VF_20. Since the virtual frames VF_17 and VF_18 are already used in the channels 1 and 2, it is the virtual frames VF_19 and VF_20 for SD that are the virtual frames having the status information of "BLANK".

Should there be the virtual frames with the status information of "BLANK", the host CPU proceeds to a step S46. Should there be no virtual frames with the status information of "BLANK", the host CPU proceeds to a step S43 to set up a standby state for awaiting the void virtual frame.

In the step S46, the host CPU is responsive to there being the virtual frame having the status information of "BLANK" to procure this virtual frame.

For example, in the case of the virtual frame, shown in FIG. 16, either VF_19 or VF_20 is procured. It is assumed herein that the VF_19 has been secured.

In a step S47, the host CPU 14 is responsive to procurement of the virtual frame to decode the SD streams, as a subject of decoding, by the decoder core 33, to generate an SD frame, and causes the so decoded SD frame to be stored in the memory area of the frame memory 34 associated with the so procured virtual frame.

In the case of the virtual frames, shown in FIG. 16, V_ch3_4 is stored in the memory area of the frame memory 34 associated with the virtual frame VF_19.

In a step S48, the host CPU 14 is responsive to failure in retrieving the virtual frame for SD, having the PTS close to or coincident with the PTS detected in the channel in question to refer to the status information of a group of the virtual frames for SD, co-owning the memory area of the frame memory 34 with the virtual frame for HD, in order to verify whether or not the group of the virtual frames for SD is in a void state.

The state of the status information of the totality of the virtual frames of the group of the virtual groups for SD, being "BLANK", is the void state of the group of the virtual frames.

If there is the group of the virtual frames in the void state, the host CPU 14 proceeds to a step S49 and, if there is no such group, the host CPU 14 proceeds to a step S50.

In the step S49, the host CPU procures the virtual frames for SD, for which the status information is "BLANK". On completion of the step S49, processing transfers to the step S47 to cause the decoder core 33 to decode the SD frames to store the so decoded SD frames in the area thus procured.

In the step S50, the host CPU 14 is responsive to the totality of the virtual frames for SD of the virtual frame group for SD, constructed in the SDRAM 15, not being in the void state, to procure the virtual frames for SD, belonging to the group of the virtual frames for SD, which will be reproduced at the earliest time in the current time point, from the virtual frames for SD, the status information of which is "BLANK".

From the above definition of the group of the SD virtual frames, it may be contemplated that the SD frames, stored in the memory area of the frame memory 34, associated with the virtual frames for SD belonging to the virtual frames for SD, hols the presentation time stamps which are proximate to or coincident with one another, so that the presentation time stamps of the SD frame group is also the same. Thus, it becomes possible to verify the time of reproduction, in terms of the virtual frame group for SD as a unit. On termination of the step S50, processing transfers to a step S47 where the SD frame is decoded by the decoder core 33. The so decoded SD frame is stored in the procured area.

If, as a result of the management of the host CPU 14, which is based on the virtual frame constructed in the SDRAM 15, the three SD frames, supplied at the time of the multi-view broadcast, have been decoded, the virtual frame for HD is procured, using the virtual frames, shown in FIG. 16, as now explained, in case the multi-view broadcast has come to a close and changed over to the normal digital high definition television.

Supposing that the frames of the respective channels are stored as the virtual frames shown in FIG. 16, the virtual frames VF_5 to VF_7, VF_9 to VF_11, VF_13 to VF_15 and VF_17 to VF_19 for SD are used at this time point, so that there is no space in the memory area in the frame memory 34 in which to store the frames for HD.

Thus, it is not possible to procure VF_1, VF_2, VF_3 and VF 4, which are virtual frames for HD.

However, if STC proceeds and V_Ch1_1, V_Ch2_1 and Ch3_1, stored in the memory area of the frame memory 34 corresponding to VF_5 to VF_7 having the earliest PTS among the virtual frames, are read out from the frame memory 34, it is possible to procure the virtual frame VF_1 for HD, co-owning the memory area in the frame memory 34.

In a similar manner, the virtual frames VF_2, VF_3 and VF_4 for HD can be sequentially procured by reading out V_Ch1_2, V$_{13}$ Ch2$_{13}$ 2 and Ch3$_{13}$ 2, stored in the memory area of the frame memory 34 corresponding to VF_9 to VF_11, reading out V_Ch3, V_Ch2_3 and Ch3_3, stored in the memory area of the frame memory 34 corresponding to VF_13 to VF_15 and by reading out V_Ch1_4, V_Ch2_4 and Ch3_4, stored in the memory area of the frame memory 34 corresponding to VF_17 to VF_19.

Since the virtual frames for HD can be sequentially procured, the multi-view broadcast can be changed over to digital high definition television. Thus, even in case the streams supplied to the MPEG video recorder 17 is changed over from the three SD streams to the sole HD stream, it is possible to prohibit transient interruption of the decoding processing otherwise caused due to impossibility of procuring the memory area of the frame memory 34.

That is, "seamless" decoding processing is possible even in case the multi-view broadcast has been changed over to digital high definition television broadcast, and hence the picture provided to the user is spontaneously changed from the multi-view picture to the digital high definition picture.

Figure 17:
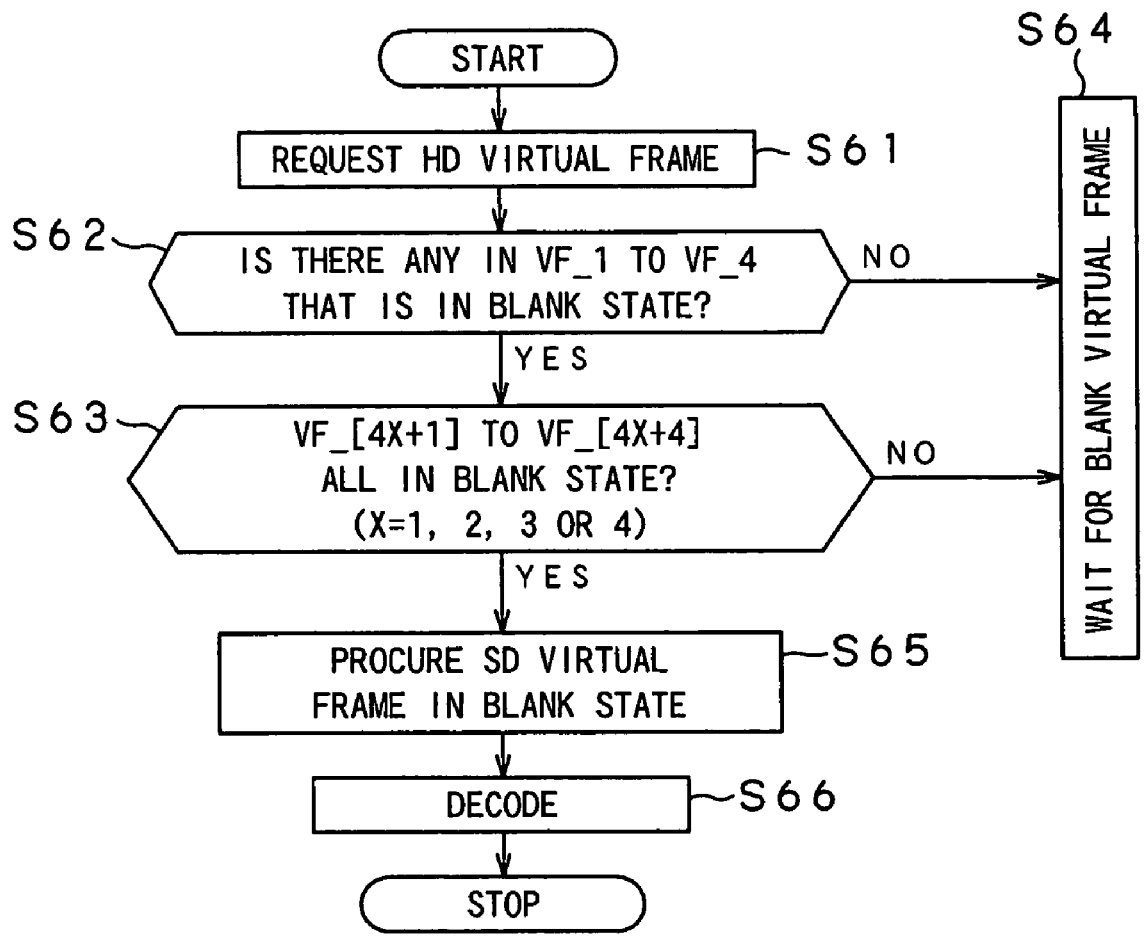
FIG. 17 is a flowchart showing a management operation of a host CPU employing virtual frames in case of decoding the digital high definition television broadcast.

Referring now to the flowchart shown in FIG. 17, the decoding management operation, employing the virtual frames in reproducing the digital high definition television broadcast, is now explained.

In a step S61, the host CPU 14 is responsive to the HD stream having been supplied to request a virtual frame required in the decoding processing.

In a step S62, the host CPU 14 retrieves whether or not the status information of the virtual frames VF_1 to VF_4, among the virtual frames constructed in the SDRAM 15, is "BLANK". If the status information is "BLANK", the host CPU proceeds to a step S63 and, if the status information is not "BLANK", the host CPU proceeds to a step S64.

In the step S63, the host CPU 14 verifies whether or not the entire status information of the virtual frame memory for SD, co-owning the memory area of the frame memory 34 with the virtual frame for HD, among the virtual frames VF_1 to VF_4 for HD, the status information for which is "BLANK", is "BLANK".

For example, if the status information of the virtual frame VF_1 for HD is "BLANK", the status information of the frame memories VF_5 to VF_8 for SD is verified. If the status information of the virtual frame VF_2 for HD is "BLANK", the status information of the frame memories VF_9 to VF_12 for SD is verified. If the status information of the virtual frame VF_3 for HD is "BLANK", the status information of the frame memories VF_13 to VF_16 for SD is verified. If the status information of the virtual frame VF_4 for HD is "BLANK", the status information of the frame memories VF_17 to VF_20 for SD is verified.

If the status information of the virtual frames for SD is "BLANK" in its entirety, the host CPU 14 proceeds to a step S65. If the status information of even one of the virtual frames for SD is not "BLANK", the host CPU 14 proceeds to a step S64.

In the step S64, the host CPU 14 is in a standby state of awaiting the status information of the virtual frame becoming "BLANK" to produce a void virtual frame.

In the step S65, the host CPU 14 is responsive to there being the virtual frame fro HD, the status information for which is "BLANK", to procure this virtual frame.

In a step S66, the host CPU 14 is responsive to the virtual frame for HD having been procured to decode the HD stream, as a subject of decoding, by the decoder core 33, to generate an HD frame, and causes the so decoded HD frame to be stored in the memory area of the frame memory 34 corresponding to the so procured virtual frame.

Thus, by the management of the host CPU 14, which is based on the virtual frame constructed in the SDRAM 15, the sole HD stream, supplied in broadcasting the digital high definition television, is decoded. If the digital high definition television comes to a close and changed over to the multi-view broadcast, the virtual frames for SD are procured, using the virtual frames, as now explained.

For example, if the totality of the virtual frames VF_1 to VF_4 for HD are occupied, the earliest PTS in the virtual frames for HD is that of the virtual frame for HD VF_1, the host CPU 14 reads out the HD frame stored in the memory area of the frame memory 34 corresponding to the virtual frame VF_1 for HD to free the virtual frame VF_1 for HD.

When the virtual frame VF_1 for HD is freed, the virtual frames VF_5 to VF_8 for SD, co-owning the memory area of the frame memory 34 with the virtual frame VF_1, are also freed. In a similar manner, the virtual frames for SD are procured at a rate of four frames at a time by sequentially performing the similar operations for the virtual frames VF_2 to VF_4 for HD.

Thus, by the respective channels procuring the freed virtual frames for SD and executing the decoding processing, the digital high definition television can be changed over to multi-view broadcast, such that, even in case the streams supplied to the MPEG video recorder 17 are changed over from the sole HD stream to the three SD streams, it is possible to prevent transient interruption of the decoding processing brought about by the impossibility of procuring the memory area in the frame memory 34.

That is, even in case the digital high definition television has been changed over to multi-view broadcast, "seamless" decoding may be achieved, and hence the image supplied to the user is spontaneously changed over from the digital high definition television broadcast to multi-view broadcast.

The present invention is not limited to the embodiments described with reference to the drawings and, as may be apparent to those skilled in the art, various changes, substitutions or equivalents may be envisaged without departing from the spirit and scope of the invention as defined in the appended claims.

INDUSTIRAL APPLICABILITY

The decoding apparatus according to the present invention allows execution of the decoding processing, in keeping with multi-view broadcast, by using the storage area of picture stream data storage means, by allocation which depends on the number of the input picture stream data, by controlling the readout of the picture stream data from the storage area based on the state-of-use information indicating the state of use of the picture frame storage means, supervised by the management table, and by decoding the so read out picture stream data into picture frames by decoding means.

The decoding method according to the present invention allows execution of the decoding processing in keeping with multi-view broadcast, by using the storage area of picture stream data storage means, by allocation which depends on the number of the input picture stream data, by controlling the readout of the picture stream data from the storage area based on the state-f-use information indicating the state of use of the picture frame storage means, supervised by the management table, and by decoding the so read out picture stream data into picture frames by a decoding step.

The invention claimed is:

1. A decoding apparatus comprising
picture stream data storage means for storing input m picture stream data to each of storage areas allocated to the respective picture stream data, where m is a natural number;
picture stream data readout means for time-divisionally reading out said m picture stream data stored in said picture stream data storage means;
decoding means for decoding said m picture stream data, time-divisionally read out from said picture stream data readout means, into respective picture frames;
picture frame storage means for storing said picture frames decoded by said decoding means;
first decision means for determining whether or not said picture frames are storable in said picture frame storage means;
second decision means for determining whether or not said picture stream data are decodable by said decoding means;
controlling means for controlling the readout of said picture stream data from said picture stream data storage means by said picture stream data readout means based on the results of decision by said first decision means and said second decision means;
picture frame readout means for reading out said picture frames stored in said picture frame storage means; and
outputting means for arraying the picture frames, corresponding to the respective picture stream data read out by said picture frame readout means, on the same picture screen, and outputting the picture data.

2. The decoding apparatus according to claim 1 further comprising management table storage means for storing a management table supervising the state-of-use information showing the state of use of said picture frame storage means.

3. A decoding method comprising
a picture stream data storage step of storing input m picture stream data to storage areas allocated to the respective picture stream data, where m is a natural number;
a picture stream data readout step of time-divisionally reading out said m picture stream data stored in said picture stream data storage step;
a decoding step of decoding said m picture stream data, time-divisionally read out from said picture stream data readout step, into respective picture frames;
a picture frame storage step of storing said picture frames decoded by said decoding step in said picture frame storage means;
a first decision step of determining whether or not said picture frames are storable in said picture frame storage step;
a second decision step of determining whether or not said picture stream data are decodable in said decoding step;
a controlling step of controlling the readout of said picture stream data from said picture stream data storage means in said picture stream data readout step based on the results of decision by said first decision step and said second decision step;
a picture frame readout step of reading out said picture frames stored in said picture frame storage means; and
an outputting step of arraying the picture frames, corresponding to the respective picture stream data read out by said picture frame readout step, on the same picture screen, and outputting the picture data.

4. The decoding method according to claim 3 further comprising a management table storage step of storing a management table supervising the state-of-use information showing the state of use of said picture frame storage means.

5. A decoding apparatus comprising
inputting means for supplying a multiplexed stream, obtained on multiplexing m picture stream data, where m is a natural number;
demultiplexing means for demultiplexing the multiplexed stream, supplied to said inputting means, into m picture stream data;
picture stream data storage means for storing m picture stream data, demultiplexed by said demultiplexing means, to respective storage areas, allocated to the respective picture stream data, where m is a natural number;
picture stream data readout means for time-divisionally reading out said picture stream data stored in said picture stream data storage means;
decoding means for decoding said m picture stream data, read out from said picture stream data readout means, into respective picture frames;
picture frame storage means for storing said picture frames decoded by said decoding means;

first decision means for determining whether or not said picture frames are storable in said picture frame storage means;

second decision means for determining whether or not said picture stream data are decodable by said decoding means;

controlling means for controlling the readout of said picture stream data from said picture stream data storage means by said picture stream data readout means, based on the results of decision by said first decision means and said second decision means;

picture frame readout means for reading out said picture frames stored in said picture frame storage means; and outputting means for arraying the picture frames, corresponding to the respective picture stream data read out by said picture frame readout means, on the same picture screen, and outputting the picture data.

6. The decoding apparatus according to claim 5 further comprising management table storage means for storing a management table supervising the state-of-use information showing the state of use of said picture frame storage means.

7. The decoding apparatus according to claim 5 further comprising receiving means for receiving a multiplexed stream, obtained on multiplexing m picture stream data, transmitted modulated to a preset frequency, where m is a natural number;

said inputting means supplying a multiplexed stream obtained on multiplexing said m picture stream data received by said receiving means.

8. The decoding apparatus according to claim 7 further comprising recording means for recording the multiplexed stream, received by said receiving means, on a recording medium.

9. The decoding apparatus according to claim 8 further comprising reproducing means for reproducing the multiplexed stream recorded by said recording means on said recording medium;

said inputting means supplying a multiplexed stream reproduced by said reproducing means.

10. The decoding apparatus according to claim 9 further comprising loading means for loading a recording medium having recorded a multiplexed stream obtained on multiplexing m picture stream data;

said reproducing means reproducing the multiplexed stream recorded on said recording medium loaded on said loading step.

11. A decoding method comprising an inputting step for supplying a multiplexed stream, obtained on multiplexing m picture stream data, where m is a natural number;

a demultiplexing step for demultiplexing the multiplexed stream, supplied to said inputting step, into m picture stream data;

a picture stream data storage step for storing m picture stream data, demultiplexed by said demultiplexing step, in each of respective storage areas, allocated to the respective picture stream data, where m is a natural number;

a picture stream data readout step for time-divisionally reading out said picture stream data stored in said picture stream data storage step;

a decoding step for decoding said m picture stream data, read out from said picture stream data readout step, into respective picture frames;

a picture frame storage step for storing said picture frames decoded by said decoding step in picture frame storage means;

a first decision step for determining whether or not said picture frames are storable in said picture frame storage means;

a second decision step for determining whether or not said picture stream data are decodable in said decoding step;

a controlling step for controlling the readout of said picture stream data from said picture stream data storage means in said picture stream data readout step based on the results of decision by said first decision step and said second decision step;

a picture frame readout step for reading out said picture frames stored in said picture frame storage step; and an outputting step for arraying the picture frames, corresponding to the respective picture stream data read out by said picture frame readout step, on the same picture screen, and outputting the picture data.

12. The decoding method according to claim 11 further comprising a management table storage step for storing in management table storage means a management table supervising the state-of-use information showing the state of use of said picture frame storage means.

13. The decoding method according to claim 11 further comprising a receiving step for receiving a multiplexed stream, obtained on multiplexing m picture stream data, transmitted modulated to a preset frequency, where m is a natural number;

said inputting step supplying a multiplexed stream obtained on multiplexing said m picture stream data received by said receiving step.

14. The decoding method according to claim 13 further comprising a recording step for recording the multiplexed stream, received by said receiving step, on a recording medium.

15. The decoding method according to claim 14 further comprising a reproducing step for reproducing the multiplexed stream recorded by said recording step on said recording medium;

said inputting step supplying a multiplexed stream reproduced by said reproducing step.

16. The decoding apparatus according to claim 15 further comprising a loading step for loading a recording medium having recorded a multiplexed stream obtained on multiplexing m picture stream data;

said reproducing step reproducing the multiplexed stream recorded on said recording medium loaded on said loading step.

* * * * *